United States Patent [19]

Schena et al.

[11] Patent Number: 6,050,718
[45] Date of Patent: *Apr. 18, 2000

[54] METHOD AND APPARATUS FOR PROVIDING HIGH BANDWIDTH FORCE FEEDBACK WITH IMPROVED ACTUATOR FEEL

[75] Inventors: Bruce M. Schena, Menlo Park; Louis B. Rosenberg, Pleasanton, both of Calif.

[73] Assignee: Immersion Corporation, San Jose, Calif.

[*] Notice: This patent is subject to a terminal disclaimer.

[21] Appl. No.: 08/791,020

[22] Filed: Jan. 27, 1997

Related U.S. Application Data

[63] Continuation-in-part of application No. 08/623,660, Mar. 28, 1996, Pat. No. 5,691,898.

[51] Int. Cl.[7] .................................................. G06F 19/00
[52] U.S. Cl. ............................ 364/190; 345/161; 463/38
[58] Field of Search ............................... 364/167.01, 188, 364/189, 190, 578, 167.02, 167.07, 167.08, 167.09, 167.11; 345/161, 179, 156; 395/95; 318/628; 414/5; 463/30, 36–43; 74/471; 200/6 A

[56] References Cited

U.S. PATENT DOCUMENTS

| | | | |
|---|---|---|---|
| 3,795,150 | 3/1974 | Eckhardt | 74/5.4 |
| 3,875,488 | 4/1975 | Crocker et al. | 318/648 |
| 3,919,691 | 11/1975 | Noll | 340/172.5 |
| 4,197,488 | 4/1980 | Kant | 318/115 |
| 4,382,217 | 5/1983 | Horner et al. | 318/778 |
| 4,398,889 | 8/1983 | Lam et al. | 434/45 |

(List continued on next page.)

FOREIGN PATENT DOCUMENTS

| | | |
|---|---|---|
| 4-34610 | 2/1992 | Japan . |
| 2254911 | 10/1992 | United Kingdom . |
| WO9520787 | 8/1995 | WIPO . |
| WO9520788 | 8/1995 | WIPO . |
| WO9532459 | 11/1995 | WIPO . |
| WO9616397 | 5/1996 | WIPO . |

OTHER PUBLICATIONS

Jacobsen, S.C. et al., "High Performance, High Dexterity, Force Reflective Teleoperator II," ANS Topical Meeting on Robotics & Remote Systems, Albuquerque, New Mexico Feb. 24–27, 1991, pp. 1–10.

Kotoku, Tetsuo et al., "Environment Modeling for the Interactive Display (EMID) Used in telerobotic Systems", IEEE Nov. 3–5, 1991, pp. 99–1004.

Bejczy, Antal K., "The Phantom Robot: Predictive Displays for Teleopertion with Time Delay," IEEE 1990, pp. 546–550.

(List continued on next page.)

*Primary Examiner*—Joseph Ruggiero
*Attorney, Agent, or Firm*—James R. Riegel

[57] ABSTRACT

A method and apparatus for providing low-cost, realistic force feedback including an improved actuator. Force sensations are provided to a user and an interface device coupled to a host computer allows a user to interact with a host application program. A user object, such as a joystick, is moveable by a user in at least one rotary degree of freedom. A sensor reports a locative signal to the host computer to indicate a position of the user object. An actuator outputs forces on the user object in response to signals from the host computer and program. The actuator includes a housing, a set of grounded magnets provided on opposing surfaces of the housing and creating a magnetic field, and a rotor coupled to the user object positioned between the magnets. The rotor rotates about an axis of rotation and includes a shaft and teeth spaced around the shaft. An electric current flows through one or more coils on the teeth to cause the rotor to rotate. The teeth and the magnets are provided in a skewed, helical arrangement relative to each other so that, as the rotor rotates, a first tooth gradually exits the magnetic field as the next consecutive tooth gradually enters the magnetic field, thereby significantly reducing a cogging effect of the rotor when the user object is moved by the user and increasing the fidelity of forces experienced by the user.

27 Claims, 10 Drawing Sheets

U.S. PATENT DOCUMENTS

| | | | |
|---|---|---|---|
| 4,436,188 | 3/1984 | Jones | 188/378 |
| 4,477,043 | 10/1984 | Repperger | 244/223 |
| 4,550,617 | 11/1985 | Fraignier et al. | 73/862.04 |
| 4,632,341 | 12/1986 | Repperger et al. | 244/230 |
| 4,676,002 | 6/1987 | Slocum | 33/1 MP |
| 4,689,449 | 8/1987 | Rosen | 200/6 |
| 4,769,763 | 9/1988 | Trieb et al. | 364/559 |
| 4,775,289 | 10/1988 | Kazerooni | 414/735 |
| 4,800,721 | 1/1989 | Cemenska et al. | 60/393 |
| 4,803,413 | 2/1989 | Kendig et al. | 318/648 |
| 4,874,998 | 10/1989 | Hollis, Jr. | 318/568.21 |
| 4,897,582 | 1/1990 | Otten et al. | 318/135 |
| 4,907,970 | 3/1990 | Meenen, Jr. | 434/45 |
| 4,925,312 | 5/1990 | Onaga et al. | 364/165 X |
| 4,933,584 | 6/1990 | Harms et al. | 318/138 X |
| 4,961,038 | 10/1990 | MacMinn | 318/696 |
| 4,961,138 | 10/1990 | Gorniak | 364/200 |
| 4,983,901 | 1/1991 | Lehmer | 318/685 |
| 4,985,652 | 1/1991 | Oudet et al. | 310/15 |
| 5,007,085 | 4/1991 | Greanias et al. | 380/25 |
| 5,007,300 | 4/1991 | Siva | 74/471 XY |
| 5,044,956 | 9/1991 | Behensky et al. | 434/45 |
| 5,072,361 | 12/1991 | Davis et al. | 364/167.01 |
| 5,088,046 | 2/1992 | McMurtry et al. | 364/474.03 |
| 5,103,404 | 4/1992 | McIntosh | 414/5 X |
| 5,107,080 | 4/1992 | Rosen | 200/6 |
| 5,116,051 | 5/1992 | Moncrief et al. | 273/448 D |
| 5,116,180 | 5/1992 | Fung et al. | 414/5 |
| 5,136,194 | 8/1992 | Oudet et al. | 310/15 |
| 5,139,261 | 8/1992 | Openiano | 273/148 B |
| 5,142,931 | 9/1992 | Menahem | 74/471 XY |
| 5,143,505 | 9/1992 | Burdea et al. | 414/5 |
| 5,181,181 | 1/1993 | Glynn | 364/566 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,220,260 | 6/1993 | Schuler | 318/561 |
| 5,223,776 | 6/1993 | Radke et al. | 318/568.1 |
| 5,228,356 | 7/1993 | Chuang | 74/471 XY |
| 5,243,266 | 9/1993 | Kasagami et al. | 318/568.1 |
| 5,264,768 | 11/1993 | Gregory et al. | 318/628 X |
| 5,289,273 | 2/1994 | Lang | 348/121 |
| 5,327,790 | 7/1994 | Levin et al. | 73/862.325 |
| 5,354,162 | 10/1994 | Burdea et al. | 414/5 |
| 5,389,865 | 2/1995 | Jacobus et al. | 318/568.11 |
| 5,396,266 | 3/1995 | Brimhall | 345/161 |
| 5,397,323 | 3/1995 | Taylor et al. | 606/130 |
| 5,402,582 | 4/1995 | Raab | 33/503 |
| 5,405,152 | 4/1995 | Katanics et al. | 463/2 |
| 5,414,337 | 5/1995 | Schuler | 318/561 |
| 5,428,748 | 6/1995 | Davidson et al. | 395/275 |
| 5,429,140 | 7/1995 | Burdea et al. | 128/774 |
| 5,451,924 | 9/1995 | Massimino et al. | 340/407.1 |
| 5,473,235 | 12/1995 | Lance et al. | 318/628 X |
| 5,482,051 | 1/1996 | Reddy et al. | 128/733 |
| 5,512,919 | 4/1996 | Araki | 345/156 |
| 5,513,100 | 4/1996 | Parker et al. | 364/167 |
| 5,532,585 | 7/1996 | Oudet et al. | 324/207.22 |
| 5,551,701 | 9/1996 | Bouton et al. | 463/36 |
| 5,576,727 | 11/1996 | Rosenberg et al. | 345/179 |
| 5,577,581 | 11/1996 | Jarvik | 482/4 |
| 5,589,828 | 12/1996 | Armstrong | 341/20 |
| 5,589,854 | 12/1996 | Tsai | 345/161 |
| 5,591,924 | 1/1997 | Hilton | 73/862.043 |
| 5,623,582 | 4/1997 | Rosenberg | 395/99 |
| 5,625,576 | 4/1997 | Massie et al. | 364/678 |
| 5,629,594 | 5/1997 | Jacobus et al. | 318/568 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,473 | 9/1997 | Wallace | 345/420 |
| 5,721,566 | 2/1998 | Rosenberg et al. | 345/161 |
| 5,731,804 | 3/1998 | Rosenberg | 345/161 |
| 5,734,373 | 3/1998 | Rosenberg et al. | 345/161 |
| 5,739,811 | 4/1998 | Rosenberg et al. | 345/161 |
| 5,742,278 | 4/1998 | Chen et al. | 345/156 |
| 5,767,839 | 6/1998 | Rosenberg | 345/161 |

OTHER PUBLICATIONS

Buttolo, Pietro et al., "Pen–Based Force Display for Precision Manipulation in Virtual Environments," IEEE Mar. 1995, pp. 1–8.

Tan, Hong Z. et al., "Human Factors for the Design of Force–Reflecting Haptic Interfaces," Tan, Srinivasan, Eberman, & Chang, ASME WAM 1994, pp. 1–11.

Ellis, R.E. et al., "Design and Evaluation of a High–Performance Prototype Planar Haptic Interface," ASME Dec. 3. 1993, DSC–vol. 49, pp. 55–64.

Colgate J. Edward et al., Implementation of Stiff Virtual Walls in Force–Reflecting Interfaces, Sep. 22, 1993.

Iwata, Hiroo et al, Volume Haptization, IEEE 1993, pp. 16–18.

Fischer, Patrick et al., "Specification and Design of Input Devices for Teleoperation," 1990.

Burdea, Grigore et al., "Distributed Virtual Force Feedback," IEEE, May 2, 1993, pp. 25–44.

Rosenberg, Louis B., "The Use of Virtual Fixtures as Perceptual Overlays to Enhance Operator Performance in Remote Environments," Air Force Material Command, Sep. 1992, pp. 1–42.

Rosenberg, Louis B., "The Use of Virtual Fixtures to Enhance Operator Performance in Time Delayed Teleoperation", Armstrong Laboratory, Mar. 1993, pp. 1–45.

Rosenberg, Louis B., "Perceptual Design of a Virtual Rigid Surface Contact," Center for Design Reseach Stanford University, Air Force Material Command, Apr. 1993, pp. 1–41.

Rosenberg, Louis B. et al., "Perceptual Decomposition of Virtual Haptic Surfaces," IEEE, Oct. 1993.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Yamakita, M. et al., Tele–Virtual Reality of Dynamic Mechanical Model, IEEE Jul. 7–10, 1992, pp. 1103–1110.

Adlestein, Bernard D. et al., "Design and Implementation of a Force Reflecting Manipulandum for Manual Control Research," 1992, pp. 1–24.

Hannaford, Blake et al., "Performance Evaluation of a Six–Axis Generalized Force–Reflecting Teleoperator," IEEE May/Jun. 1991, vol. 21, No. 3, pp. 620–633.

Minsky, Margaret t al., "Feeling and Seeing: Issues in Force Display," ACM 1990, pp. 235–242.

Herndon, J.N. et al., "The State–of–the–Art Model M–2 Maintenance System," Proceedings of the 1984 National Topical Meeting on Robotics and Remote Handling in Hostile Environments, American Nuclear Society, pp. 59–65.

Batter, James J. et al., "Grope–1: A Computer Display to the Sense of Feel," pp. TA–4–188–TA–4–192; Date unknown.

Gotow, J.K., et al., "Perception of Mechanical Properties at the Man–Machine Interface," IEEE 1987, pp. 688–689.

Atkinston, William D. et al, "Computing with Feeling," Comput. & Graphics, vol. 2, No. 2–E, pp. 97–103; Date unknown.

Noll, A. Michael, "Man–Machine Tactile Communication Dissertation," Polytechnic Institute of Brooklyn, Jun. 1971, pp. 1–88.

Ouh–Young, Ming, "Force Display in Molecular Docking," Chapel Hill 1990, pp. 1–85.

Ouh–young, Ming et al., "Using a Manipulator for Force Display in Molecular Docking," IEEE 1988, pp. 1824–1829.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Tan, Hong Z et al., "Manual Resolution of Compliance When Work and Force Cues are Minimized," ASME 1993, DSC–vol. 49, pp. 99–104.

Iwata, Hiroo, "Pen–based Haptic Virtual Environment," Institute of Engineering Mechanics, University of Tsukuba, Japan, pp. 287–292; Date unknown.

Kotoku, Tetsuo, "A Predictive Display with Force Feedback and its Application to Remote Manipulation System with Transmission Time Display," IEEE 1992, Jul. 7–10, 1992, pp. 239–246.

Howe, Robert D., "Task Performance with a Dextrous Teleoperated Hand System," Proceedings of SPIE, Nov. 1992, vol. 1833, pp. 1–9.*

Snow, E. et al., "Compact Force–Reflecting Hand Controller," JPL, Apr. 1991, vol. 15, No. 3, Item No. 153, pp. 1–15a.

McAffee, Douglas A., "Teleoperator System/Telrobot Demonstrator: Force Reflecting Hand Controller Equipment Manual," JPL Jan. 1988, pp. 3–8, 11, and A–34.

Schmult, Brian et al., "Application Areas for a Force–Feedback Joystick," ASME 1993, DSC–vol. 49, pp. 47–54.

Hasser, Christopher John, "Tactile Feedback for a Force–Reflecting Haptic Display," The School of Engineering, University of Dayton, Dec. 1995, pp. iii–xii & 1–96.

Russo, Massimo Andrea, "The Design and Implementation of a Three Degree–of–Freedom Force Output Joystick," Department of Mechanical Engineering, May 11, 1990, pp. 9–40 & 96 & 97.

Kilpatrick, Paul Jerome, "The Use of a Kinesthetic Supplement in an Interactive Graphics System", University of North Carolina at Chapel Hill, 1976.

Winey III, Calvin Mccoy, "Computer Simulated Visual and Tactile Feedback as an Aid to Manipulator and Vehicle Control," MIT, Jun. 1981.

Rosenberg, L.B., "Commercially Viable Force Feedback Controller for Individuals with Neuromotor Disabilities", AL/CF–TR–1997–0016, United States Air Force Armstrong Laboratory, May 1996, pp. 1–33.

Rosenberg et al., "Using Force Feedback to Enhance Human Performance in Graphical User Interfaces", Apr. 1996, www.acm.org.

Repperger, D.W., "Active Force Reflection Devices in Teleoperation", IEEE Control Systems, 1991, pp. 52–56.

Yokokohji, Y., et al, "What You Can See is What You Can Feel—Development of a Visual/Haptic Interface to Virtual Environment", Proceedings of VRAIS, 1996, pp. 46–53.

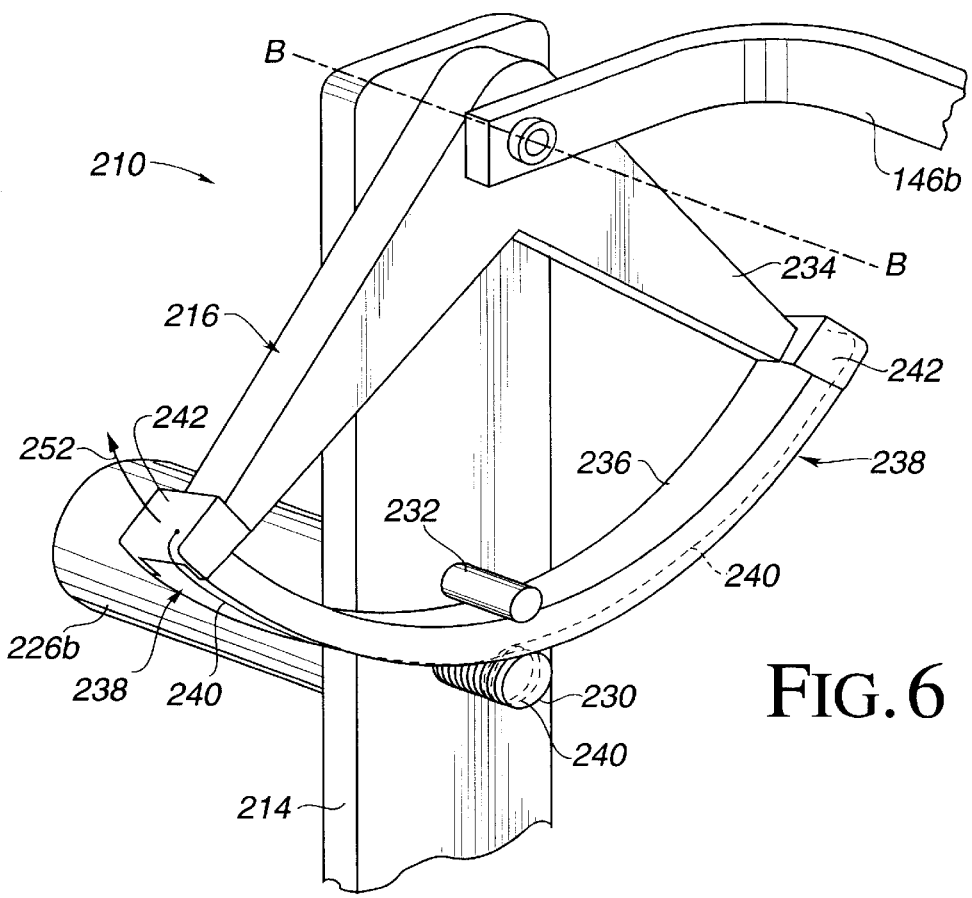
FIG. 6
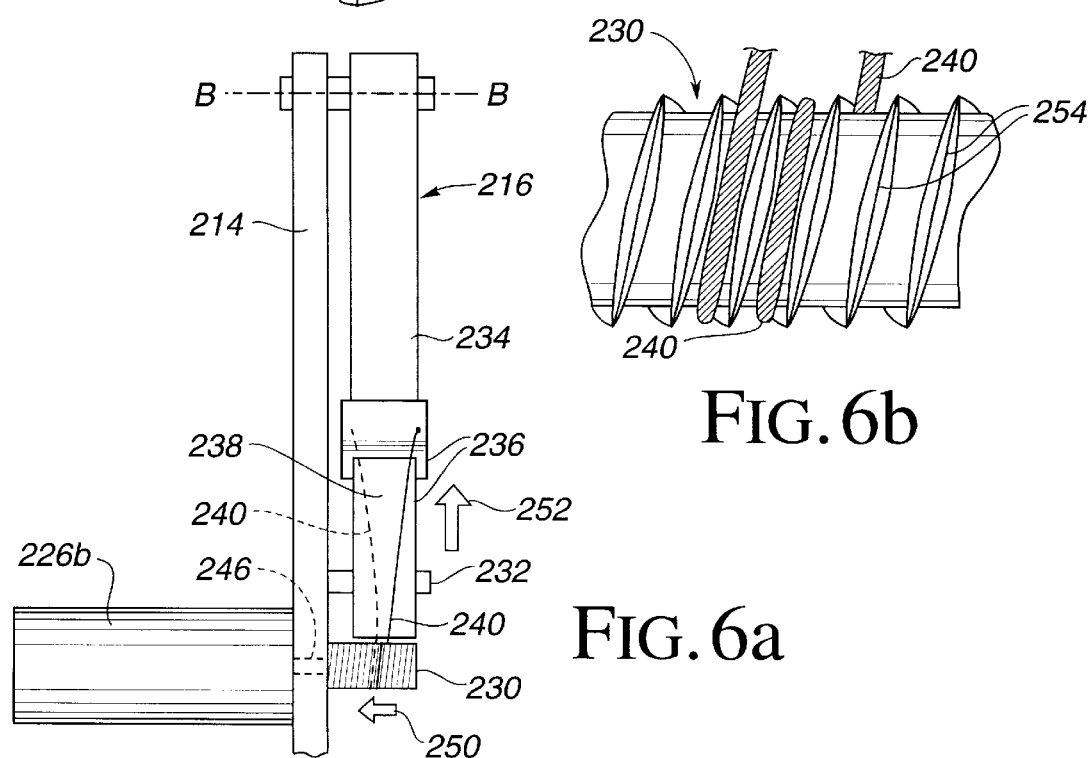
FIG. 6a
FIG. 6b

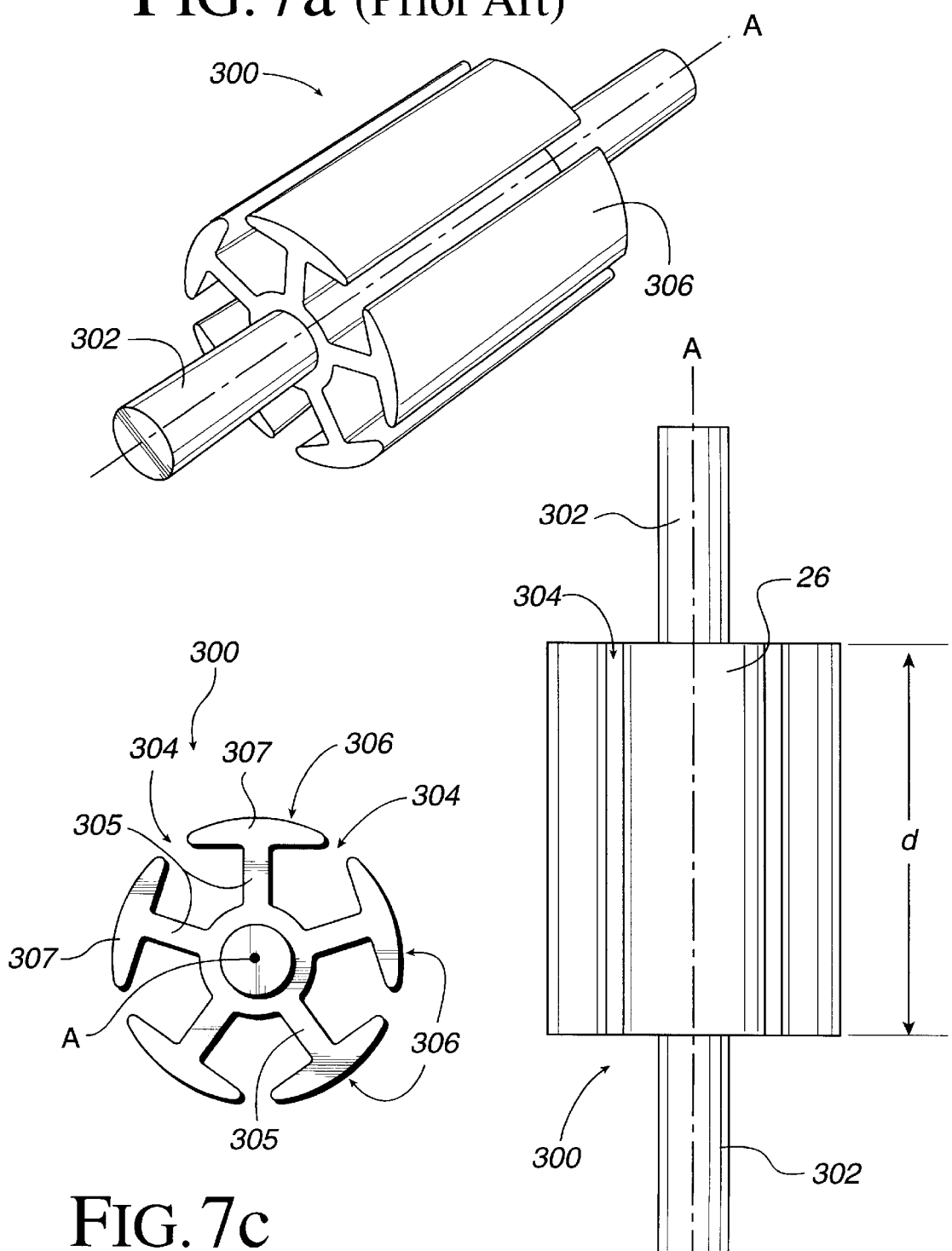

METHOD AND APPARATUS FOR PROVIDING HIGH BANDWIDTH FORCE FEEDBACK WITH IMPROVED ACTUATOR FEEL

CROSS REFERENCE TO RELATED APPLICATIONS

This application is a continuation-in-part of parent patent application Ser. No. 08/623,660, now U.S. Pat. No. 5,691,898 filed Mar. 28, 1996 on behalf of Louis B. Rosenberg et al., entitled, "Safe and Low Cost Computer Peripherals with Force Feedback for Consumer Applications," assigned to the assignee of this present application, and which is hereby incorporated by reference herein.

BACKGROUND OF THE INVENTION

The present invention relates generally to interface devices between humans and computers, and more particularly to computer interface devices that provide force feedback to the user.

Computer systems are used extensively in many different industries to implement computer controlled simulations, games, and other application programs. More particularly, these types of games and simulations are very popular with the mass market of home consumers. A computer system typically displays a visual environment to a user on a display screen or other visual output device. Users can interact with the displayed environment to play a game, experience a simulation or "virtual reality" environment, or otherwise influence events or images depicted on the screen or in an application program or operating system. Such user interaction can be implemented through a human-computer interface device, such as a joystick, "joypad" button controller, mouse, trackball, stylus and tablet, foot or hand pedals, or the like, that is connected to the computer system controlling the displayed environment. The computer updates the game or simulation in response to the user's manipulation of a moved object such as a joystick handle or mouse, and provides feedback to the user utilizing the display screen and, typically, audio speakers.

Force feedback interface systems, also known as haptic systems, additionally provide force feedback to a user of the system. In a typical configuration, a host computer implements software such as an application program, simulation, or game and communicates with a connected force feedback interface device. The user grasps a user object of the interface device, such as a joystick, mouse, steering wheel, stylus, etc., and moves the object in provided degrees of freedom. The movement of the user manipulatable object is sensed by the host computer using sensors, and force sensations controlled by the host computer are provided to the user object using actuators of the force feedback interface device. Force feedback can be effectively used to simulate a variety of experiences, from a crash in a vehicle, a gun firing, a bumpy road, etc., and can thus supply the mass market of computer users an entirely new dimension in human-computer interaction.

Force sensations are created for the user of force feedback interface systems often by using actuators such as active motors that generate a torque on a rotating shaft. Nearly all common types of motors create torque through the interaction of a static magnetic field created by permanent magnets and a variable magnetic field created by electric current flowing through metallic (e.g., copper) windings. These magnetic fields are commonly directed through the stationary part of the motor (stator) and the rotating part of the motor (rotor) through ferrous structures. Brush-commutated (or "brush-type") DC motors, stepper motors, and brushless DC motors are common examples of this type of permanent magnet/iron arrangement.

One problem presented by prior art force feedback and haptic systems is the "cogging" effect occurring with the use of these types of motors. Cogging is the term used to describe the tendency of a motor rotor to align itself preferentially with the stator. In a typical brush-type DC motor, there may be multiple positions per shaft revolution where the motor rotor prefers to rest. This effect is sometimes described as "detenting" or "ratcheting" and can result in substantial variation in the output torque of the motor, both when powered and unpowered. Cogging is fundamentally caused by the change in reluctance of the magnetic flux path: the preferential positions are essentially "reluctance minimization points" where the energy stored in the magnetic circuit is at a minimum.

Cogging can be particularly problematic in force feedback devices because the motor rotational speed is so slow that the user is often able to feel each individual torque disturbance as the user manipulatable object is moved and/or as forces are output on the user object. This effect is often perceived by users as "roughness" or "pulsations" and is usually equated with poorly-performing force feedback or haptic systems. The cogging effect problem becomes even more acute in force feedback systems in which forces must be amplified by a mechanical transmission system, such as a capstan drive system, to provide users with realistic force environments, since the cogging effect is amplified as well as the forces. If low friction, high stiffness transmission systems are used, the cogging effect also is quite noticeable to the user, unlike in high friction systems such as gear systems which produce enough noise themselves to mask the cogging effect. Thus, the cogging effect reduces the realism and fidelity of forces in high bandwidth force feedback systems which are used to accurately transmit forces to the user object.

Some prior art solutions to the cogging effect have been devised. In some applications, brushless types of DC motors are used, in which the cogging effect is not as severe as in brush-type DC motors. However, brushless motors are far more expensive and complex than brush-type motors and require more sophisticated control circuitry, and thus are not as viable an option in the low-cost, mass-consumer force feedback market. Cogging can be minimized in brush-type motors by altering the magnetic design of the motor. For example, in a brush-type DC motor, a common way to minimize cogging is to simply increase the number of slots or teeth on the rotor. This approach usually reduces the amplitude of the cogging while increasing the frequency of the "pulsations." This method is expensive since more coils and teeth must be provided. Reduction of the cogging effect can also be accomplished by carefully designing the shape and size of the tips of the rotor teeth and the magnets. Through detailed analysis and design, this approach can yield some improvement, through it is usually rather small. However, neither of these techniques reduces the cogging effect to desirable levels to allow satisfactory use of low-cost motors in high bandwidth force feedback interface devices.

Another important concern for a force feedback interface device is communication bandwidth between the controlling computer and the interface device. To provide realistic force feedback, the complex devices of the prior art typically use high speed communication electronics that allow the controlling computer to quickly send and update force feedback signals to the interface device. The more quickly the controlling computer can send and receive signals to and from the interface device, the more accurately and realistically the desired forces can be applied on the interface object. However, a problem is evident when prior art force feedback interface devices are provided to the mass consumer market. The standard serial communication interfaces on personal computers and video game consoles are typically quite slow (i.e., have low bandwidth) compared to other communication interfaces. Realistic and accurate force feedback thus becomes difficult to provide by a controlling computer system to a prior art interface device connected through such a serial interface.

Finally, mass market force feedback interface devices must necessarily be low cost devices that are simple to manufacture so that the device is competitively priced in the high volume, aggressive home computer and home video game markets.

SUMMARY OF THE INVENTION

The present invention is directed to implementations of a human/computer interface device for controlling and providing force feedback to a user. An improved, low-cost actuator increases the realism of forces and movement of a user manipulatable object of the interface device.

More particularly, one embodiment of an interface apparatus and method of the present invention for providing force sensations to a user of the device includes an interface device coupled to a host computer and allowing a user to interact with an application program implemented by the host computer. The interface device includes a user object, such as a joystick, grasped by a user and having at least one rotary degree of freedom of movement. A sensor reports a locative signal to the host computer, the locative signal indicating a position of the user object within the rotary degree of freedom. An actuator outputs forces on the user object in response to signals from the host computer such that the forces are in response to the locative signal and are coordinated with events within the application program. The actuator includes a housing, a set of magnets provided on opposing surfaces of an interior of the housing and creating a magnetic field, and a rotor rotatably coupled to the housing and user object and positioned between the magnets. The rotor rotates about an axis of rotation and includes a shaft and teeth spaced apart equally about a circumference of the shaft with slots provided between the teeth. The teeth and the magnets are provided in a skewed, helical arrangement relative to each other so that, as the rotor rotates about said axis, a portion of one of the teeth gradually exits the magnetic field as a portion of a next consecutive tooth gradually enters the magnetic field. An electric current flows through one or more coils on the teeth to cause the rotor to rotate about the axis of rotation, where a cogging effect of the rotor is greatly reduced when the user object is moved by the user in the rotary degree of freedom.

Preferably, the teeth of the rotor are skewed relative to the shaft of said rotor (or to the edges of the magnets) by percentage of slot width or by a skew angle. Alternatively, the teeth have edges approximately parallel to the axis of rotation and the edges of the magnets are skewed relative to the axis of rotation. Preferably, the shaft of the rotor is coupled to a capstan drive mechanism, which is coupled to a member of a gimbal mechanism, that is in turn coupled to the user object. The capstan drive mechanism provides low compliance and high bandwidth mechanical advantage to a torque output on the shaft such that said force provided by the actuator is amplified in magnitude when applied to the user manipulatable object. The actuator can be a DC servo motor, such as a brush-type motor or a brushless motor. Multiple improved actuators can be provided in preferred embodiments.

In preferred embodiments, the host computer system implements a host application program that displays images on a computer display apparatus. The host computer system updates the host application program in response to user manipulation of the interface device and commands force feedback sensations on the user in response to the manipulations and in coordination with events in the host application program. In some embodiments, a device microprocessor, separate from the host computer system, communicates with the host computer via a communication bus by receiving a host force command from the host computer. The microprocessor executes a local process in parallel with the host application program for receiving and decoding the host force command and outputting a force signal to the actuator in response to a decoded host command.

In another aspect of the present invention, the force feedback interface device is manipulated by a user and communicates with a host computer implementing a host application program which displays images on a computer display and is updated in response to user manipulation of the interface device. The host computer commands force sensations on the user in response to the manipulations and in coordination with events in the application program. The interface device includes a user manipulatable object, a gimbal mechanism providing multiple rotary degrees of freedom to the user object, a grounded actuator for applying a rotational force along a degree of freedom to cause a feel sensation to the user that corresponds with a relevant event within the host program, a sensor for detecting a position of the user object, and a device microprocessor for communicating with the host computer by receiving a host command. The microprocessor executes a local process in parallel with the host application program to receive/decode the host command and output the force signal to the actuator in response to a decoded command. The host commands may include direct host commands to immediately output a desired force according to a force routine selected by the command, reflex commands to output a desired force according to a force routine selected by said reflex command when predetermined conditions (such as a button press) have been met, and custom profile commands for commanding the microprocessor to receive a set of data and/or command a sequence of forces over time based on the set of data.

The interface apparatus of the present invention includes an improved actuator that is suitable for providing accurate and realistic force feedback for the low cost, high volume home consumer market and similar markets. The use of a skewed rotor in the actuator allows the cogging effect of the motor to be greatly reduced, thus greatly reducing the undesired "pulsating" feel when the user object is moved by the user and when forces are output. This permits low cost motors to be provided in high bandwidth force feedback devices without the significant cogging problem inherent in prior art low-cost motors. The disclosed types of host commands also provide flexibility in providing different force sensations using low cost components such as the device microprocessor. These improvements allow a computer system to provide accurate and realistic force feedback in low-cost devices and is thus ideal for the mass market of computer and game systems.

These and other advantages of the present invention will become apparent to those skilled in the art upon a reading of

BRIEF DESCRIPTION OF THE DRAWINGS

FIG. 6 is a perspective view of a capstan drive mechanism suitable for use with the present invention;

FIG. 6a is a side elevational view of the capstan drive mechanism shown in FIG. 6;

FIG. 6b is a detailed side view of a pulley and cable of the capstan drive mechanism of FIG. 6;

FIGS. 7a–d are views of a prior art rotor used in brush-type DC motors;

DETAILED DESCRIPTION OF PREFERRED EMBODIMENTS

Figure 1:
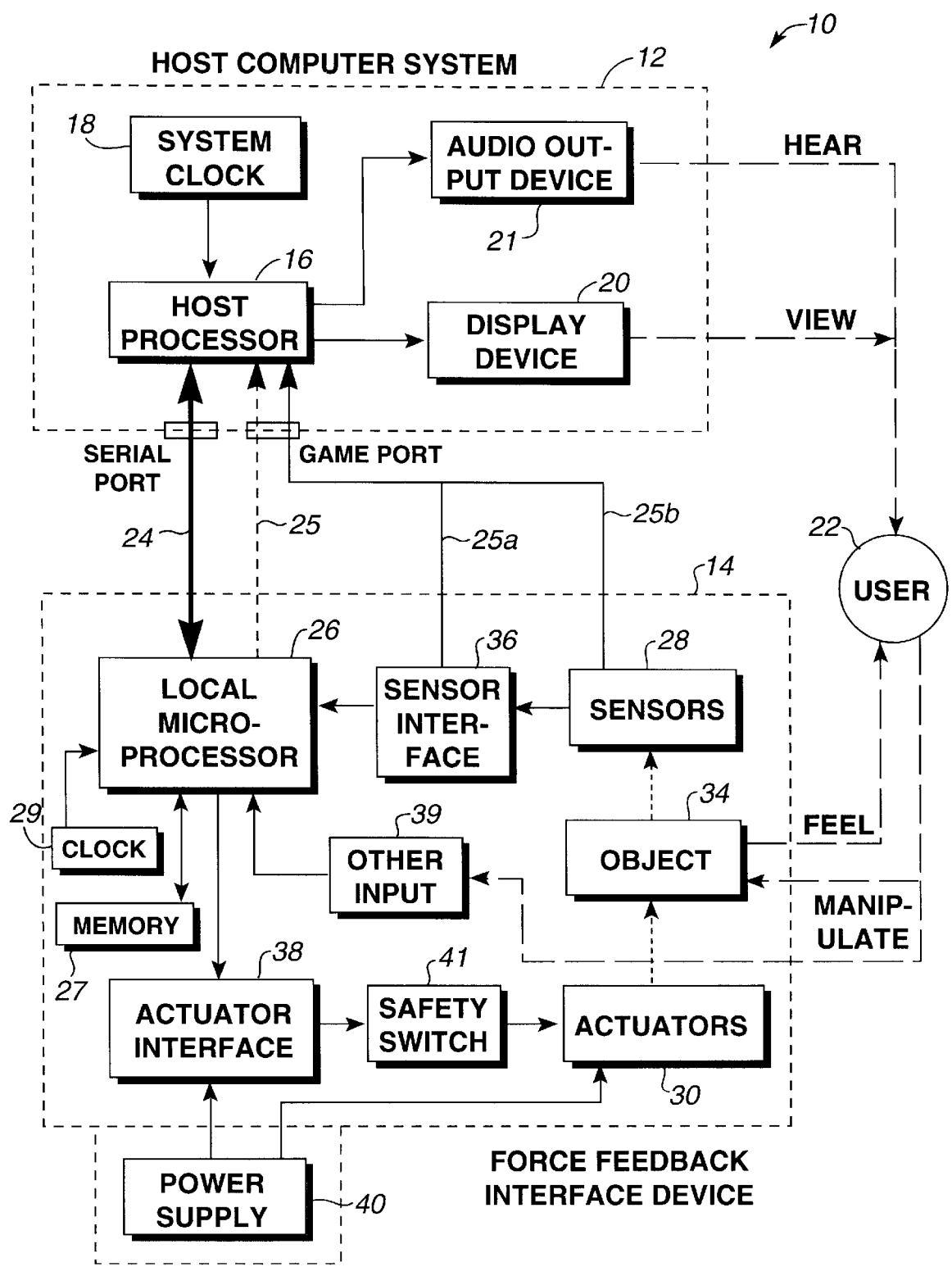
FIG. 1 is a block diagram of a control system in accordance with the present invention for controlling a force feedback interface device from a host computer.

FIG. 1 is a block diagram illustrating a generic control system 10 of the present invention for a force feedback interface device controlled by a host computer system. Control system 10 includes a host computer system 12 and an interface device 14 (or "force feedback peripheral").

Host computer system 12 ("host") is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a more application specific "set top box" or "internet computer" which can be used, for example, to provide interactive television or information functions to users.

In the described embodiment, host computer system 12 implements a host application program with which a user 22 is interacting via peripherals and interface device 14. For example, the host application program can be a video game, medical simulation, scientific analysis program, or even an operating system or other application program that utilizes force feedback. Typically, the host application provides images to be displayed on a display output device, as described below, and/or other feedback, such as auditory signals. For example, a graphical user interface used with force feedback is described in co-pending patent application Ser. No. 08/571,606, filed Dec. 13, 1995, by Rosenberg et al., and which is hereby incorporated by reference herein.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, Motorola, Advanced Micro Devices, or other manufacturers. Microprocessor 16 can be single microprocessor chip, or can include multiple primary and/or coprocessors. Microprocessor preferably retrieves and stores instructions and other necessary data from RAM 17 and ROM 19, as is well known to those skilled in the art. In the described embodiment, host computer system 12 can receive sensor data or a sensor signal via a bus 24 from sensors of interface device 14 and other information. Host microprocessor 16 can receive or transmit data on bus 24 using I/O electronics 21, and can use I/O electronics to control other peripheral devices. Host computer system 12 can also output a "force command" to interface device 14 via bus 24 to cause force feedback by the interface device.

Clock 18 is a standard clock crystal or equivalent component used by host computer system 12 to provide timing to electrical signals used by microprocessor 16 and other components of the computer system. Clock 18 is accessed by host computer system 12 in the control process of the present invention, as described subsequently.

Display screen 20 is coupled to host microprocessor 16 by suitable display drivers and can be used to display images generated by host computer system 12 or other computer systems. Display screen 20 can be a standard display screen or CRT, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be refelTed as displaying computer "objects" or "entities." These computer objects are not physical objects, but are logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer controlled "entity."

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by an interface bus 24. Bus 24 sends signals in one or both directions between host computer system 12 and the interface device. Herein, the term "bus" is intended to generically refer to any interface, connection, or communication link such as between host computer 12 and a peripheral such as interface device 14 which typically includes one or more connecting wires, lines, cables, or other connections and that can be implemented in a variety of ways. In the preferred embodiment, bus 24 is a serial interface bus providing data according to a serial communication protocol. An interface port of host computer system 12, such as an RS-232 serial interface port, connects bus 24 to host computer system 12. Other standard serial communication protocols can also be used for the serial interface and bus 24, such as RS-422, Universal Serial Bus (USB), MIDI, system-specific ports on a Sega, Sony, etc. game system, or other protocols or standards well known to those skilled in the art.

For example, the USB standard provides a relatively high speed serial interface that can provide force feedback signals in the present invention with a high degree of realism. USB can also source more power to drive peripheral devices. Since each device that accesses the USB is assigned a unique USB address by the host computer, this allows multiple devices to share the same bus. In addition, the USB standard includes timing data that is encoded along with differential data. The USB has several useful features for the present invention, as described throughout this specification.

An advantage of the present invention is that low-bandwidth serial communication signals can be used to interface with interface device 14, thus allowing a standard built-in serial interface of many computers to be used directly. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in interface card and slot or other access of computer system 12. For example, on an IBM AT compatible computer, the interface card can be implemented as an ISA, EISA, VESA local bus, PCI, or other wellknown standard interface card which plugs into the motherboard of the computer and provides input and output ports for connecting the main data bus of the computer to bus 24.

In another embodiment, an additional bus 25 can be included to communicate between host computer system 12 and interface device 14. Since the speed requirement for communication signals is relatively high for outputting force feedback signals, the single serial interface used with bus 24 may not provide signals to and from the interface device at a high enough rate to achieve realistic force feedback. In such an embodiment, bus 24 can be coupled to the standard serial port of host computer 12, while an additional bus 25 can be coupled to a second port of the host computer system. For example, many computer systems include a "game port" in addition to a serial RS-232 port to connect a joystick or similar game controller to the computer. The two buses 24 and 25 can be used simultaneously to provide an increased data bandwidth. For example, microprocessor 26 can send sensor signals to host computer 12 via a game port bus 25, while host computer 12 can output force feedback signals from a serial port to microprocessor 26 via a unidirectional bus 24. Other combinations of data flow configurations and buses can be implemented in other embodiments. For example, game port bus 25 can be directly connected from the sensors 28 (shown as bus 25a) or from the sensor interface 36 (shown as bus 25b) to the game port of the host computer 12 in some embodiments.

Another important feature that is desirable in the force feedback control system 10 is a communication line between the host computer 12 and the interface device 14 that incorporates user safety. Since forces are being generated on user object 34 by actuators 30 (as explained below), the interface device can potentially present some danger to a user if the buses 24 and/or 25 become disconnected during operation. Once the control of the force feedback from the host computer is disabled, the forces generated can become unpredictable. Thus, it is desirable for the actuators 30 to become deactivated if buses 24 and/or 25 are disconnected during operation. In the present invention, this feature can be implemented by designating one of the lines of bus 24 and/or one of the lines of bus 25 as a "life line." The microprocessor periodically reads the life line signals to check if the buses are still connected. If the device is unplugged, the microprocessor will not detect the signal and will consider the state to be "disconnected." If no signal is detected, then the microprocessor automatically sends a deactivation signal to the actuators. Likewise, in some embodiments, the host computer can periodically check a life line signal output from the microprocessor on one of the buses 24 or 25. If no such signal is detected, the host computer can output a deactivate actuators command on the other bus 24 or 25 (if still connected). In embodiments having no microprocessor 26 (see below), the life line can be coupled to a safety switch 41. For an RS-232, RS-422, or game port interface, one of the control lines in the interface bus can be used as the life line. When using a USB interface, the "Attach-Detach" feature inherent to the USB standard can conveniently be used for the life line.

It should be noted that bus 24 and bus 25 can be provided as either a uni-directional bus or a bi-directional bus. In the embodiment having both buses 24 and 25, they can both be unidirectional buses, which have several advantages for the described embodiments. This allows the full bandwidth of each bus to be used for one direction of data transfer, causing data communication rates to double compared to normal bi-directional use of each bus. Also, the communication protocol for each bus can be simplified in uni-directional operation. In addition, uni-directional driver software on the host computer can be simpler and require less processor time than software for bi-directional communication.

In yet another embodiment, signals traveling between the host computer system 12 and the interface device 14 can be sent and received using wireless transmission. For example, an antenna can be included in both interface device 14 and in host computer 12 to send and receive electromagnetic signals, such as radio signals, infrared signals, or microwave signals. In such an embodiment, a "bus" 24 or 25 can conceptually include a medium or channel of transmission/reception, such as the air.

Interface device 14 is a peripheral for host 12 that includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. For example, a separate Universal Asynchronous Receiver/Transmitter (UART) or level shifter might be included to receive/convert signals on bus 24; or, such components can be included on microprocessor 26. The embodiment of FIG. 1 provides a control loop between microprocessor 26, actuators 30, user object 34, and sensors 28 (which are connected back to microprocessor 26). Unlike the prior art, the host computer 12 is not included in the control loop, thus freeing the host of many routine tasks and allowing it to allocate host processor time to other tasks. The microprocessor 26 can receive high level commands from the host and handle the routine tasks of the control loop in reflex processes, as discussed below.

In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 (or "device microprocessor") is coupled to bus 24 and is preferably included within the housing of interface device 14 to allow quick communication with other components of the interface device. Processor 26 is considered "local" to interface device 14, and is a separate microprocessor from any microprocessors in host computer system 12. For example, the local processor 26 does not share a data bus, address bus, and/or memory with the host processor(s) 16. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 is provided with software instructions to instruct the processor to wait for commands or requests from computer host 16, decode and/or parse the commands or requests, manipulate data and select routines, and handle/control input and output signals according to the commands or requests. In addition, processor 26 preferably operates independently of host computer 16 by reading sensor signals and calculating appropriate forces from those sensor signals, time signals, and a "force routine" selected in accordance with a host command, as described with reference to FIG. 3. Suitable microprocessors for use as local microprocessor 26 include the MC68HC7 11E9 by Motorola and the PIC16C74 by Microchip, for example; other well-known types of microprocessors can also be used. Microprocessor 26 can include one microprocessor chip, or multiple processors and/or co-processor chips. In other embodiments, microprocessor 26 can includes a digital signal processor (DSP) chip. Local memory 27, such as RAM and/or ROM (EPROM, EEPROM, etc.), is preferably coupled to microprocessor 26 in interface device 14 to store instructions for microprocessor 26 and store temporary and other data. Microprocessor 26 can receive signals from sensors 28 and provide signals to actuators 30 of the interface device 14 in accordance with instructions provided by host computer 12 over bus 24.

In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In alternate embodiments using the USB communication interface, timing data for microprocessor 26 can be retrieved from the USB signal. The USB has a clock signal encoded with the data stream which can be used. Alternatively, the Isochronous (stream) mode of USB can be used to derive timing information from the standard data transfer rate. The USB also has a Sample Clock, Bus Clock, and Service Clock that also may be used.

For example, in the preferred "reflex" embodiment, host computer system 12 provides high level supervisory commands to microprocessor 26 over bus 24, and microprocessor 26 manages low level force control ("reflex") loops to sensors 28 and actuators 30 in accordance with force routines selected by the high level commands. In a different embodiment, host computer 12 can provide low-level force commands over bus 24, which microprocessor 26 directly transfers to actuators 30. These embodiments are described in greater detail with respect to the method of FIG. 3.

Microprocessor 26 preferably also has access to an electrically erasable programmable ROM (EEPROM) or other memory storage device 27 for storing calibration parameters. The calibration parameters can compensate for slight manufacturing variations in different physical properties of the components of different interface devices made from the same manufacturing process, such as physical dimensions. The calibration parameters can be determined and stored by the manufacturer before the interface device 14 is sold, or optionally, the parameters can be determined by a user of the interface device. The calibration parameters are used by processor 26 to modify the input sensor signals and/or output force values to actuators 30 to provide approximately the same range of forces on object 34 in a large number of manufactured interface devices 14. The implementation of calibration parameters is well-known to those skilled in the art.

Microprocessor 26 can also receive commands from any other input devices included on interface apparatus 14 and provides appropriate signals to host computer 12 to indicate that the input information has been received and can send any information included in the input information. For example, buttons, switches, dials, or other input controls on interface device 14 or user object 34 can provide signals to microprocessor 26. Input information might be directly sent to the host computer from the microprocessor, or it may be processed or combined with other data that is sent to the host.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. An example of such a mechanism is described with reference to FIGS. 4 and 5.

Sensors 28 sense the position, motion, and/or other characteristics of a user object 34 of the interface device 14 along one or more degrees of freedom and provide signals to microprocessor 26 including information representative of those characteristics. An example of an embodiment of a user object and movement within provided degrees of freedom is described subsequently with respect to FIG. 4. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. The encoder, for example, responds to a shaft's rotation by producing two phase-related signals in the rotary degree of freedom. Linear optical encoders similarly sense the change in position of object 34 along a linear degree of freedom, and can produces the two phaserelated signals in response to movement of a linear shaft in the linear degree of freedom. Either relative or absolute sensors can be used. For example, relative sensors only provide relative angle information, and thus usually require some form of calibration step which provide a reference position for the relative angle information. The sensors described herein are primarily relative sensors. In consequence, there is an implied calibration step after system power up wherein a sensor's shaft is placed in a known position within interface device and a calibration signal is provided to the system to provide the reference position mentioned above. All angles provided by the sensors are thereafter relative to that reference position. Alternatively, a known index pulse can be provided in the relative sensor which can provide a reference position. Such calibration methods are well known to those skilled in the art and, therefore, will not be discussed in any great detail herein. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 receives the two phase-related signals from a sensor 28 and converts the two signals into another pair of clock signals, which drive a bidirectional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. Each sensor 28 can be provided with its own sensor interface, or one sensor interface may handle data from multiple sensors. For example, the electronic interface described in Pat. No. 5,576,727, describes a sensor interface including a separate processing chip dedicated to each sensor that provides input data. Alternately, microprocessor 26 can perform these interface functions without the need for a separate sensor interface 36. The position value signals can be used by microprocessor 26 and are also sent to host computer system 12 which updates the host application program and sends force control signals as appropriate. For example, if the user moves a steering wheel object 34, the computer system 12 receives position and/or other signals indicating this movement and can move a displayed point of view of the user as if looking out a vehicle and turning the vehicle. Other interface mechanisms can also be used to provide an appropriate signal to host computer system 12. In alternate embodiments, sensor signals from sensors 28 can be provided directly to host computer system 12, bypassing microprocessor 26. Also, sensor interface 36 can be included within host computer system 12, such as on an interface board or card.

Alternatively, an analog sensor such as a potentiometer can be used instead of digital sensor for all or some of the sensors 28. For example, a strain gauge can be connected to measure forces on object 34 rather than positions of the object. Also, velocity sensors and/or accelerometers can be used to directly measure velocities and accelerations on object 34. Analog sensors can provide an analog signal representative of the position/velocity/acceleration of the user object in a particular degree of freedom. An analog to digital converter (ADC) can convert the analog signal to a digital signal that is received and interpreted by microprocessor 26 and/or host computer system 12, as is well known to those skilled in the art. The resolution of the detected motion of object 34 would be limited by the resolution of the ADC.

Other types of interface circuitry 36 can also be used. For example, an electronic interface is described in U.S. Pat. No. 5,576,727, incorporated by reference herein. The interface allows the position of the mouse or stylus to be tracked and provides force feedback to the stylus using sensors and actuators. Sensor interface 36 can include angle determining chips to pre-process angle signals reads from sensors 28 before sending them to the microprocessor 26. For example, a data bus plus chip-enable lines allow any of the angle determining chips to communicate with the microprocessor. A configuration without angle-determining chips is most applicable in an embodiment having absolute sensors, which have output signals directly indicating the angles without any further processing, thereby requiring less computation for the microprocessor 26 and thus little if any preprocessing. If the sensors 28 are relative sensors, which indicate only the change in an angle and which require further processing for complete determination of the angle, then angle-determining chips are more appropriate.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators.

Active actuators include linear current control motors, stepper motors, pneumatic/hydraulic active actuators, voice coils, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. The motors may also include brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), or a voice coil actuator, which are well known to those skilled in the art.

Passive actuators can also be used for actuators 30. Magnetic particle brakes, friction brakes, or pneumatic/hydraulic passive actuators can be used in addition to or instead of a motor to generate a damping resistance or friction in a degree of motion. An alternate preferred embodiment only including passive actuators may not be as realistic as an embodiment including motors; however, the passive actuators are typically safer for a user since the user does not have to fight actively-generated forces. Passive actuators typically can only provide bi-directional resistance to a degree of motion. A suitable magnetic particle brake for interface device 14 is available from Force Limited, Inc. of Santa Monica, Calif.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), and other components. In alternate embodiments, interface 38 circuitry can be provided within microprocessor 26 or in actuators 30.

Other input devices 39 can optionally be included in interface device 14 and send input signals to microprocessor 26. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord.

Alternatively, if the USB interface, game port, or similar communication interface is used, interface device 14 can draw power from the bus 24 and/or 25 and thus have no need for power supply 40. This embodiment is most applicable to a device 14 having passive actuators 30, since passive actuators require little power to operate. For example, active actuators tend to require more power than can be drawn from USB, but this restriction can be overcome in a number of ways. One way is to configure interface 14 to appear as more than one peripheral to host computer 12; for example, each provided degree of freedom of user object 34 can be configured as a different peripheral and receive its own allocation of power. This would allow host 12 to allocate more power to interface device 14. Alternatively, power from the bus 24 and/or 25 can be stored and regulated by interface device 14 and thus used when needed to drive actuators 30. For example, power can be stored over time and then immediately dissipated to provide a jolt force to the user object 34. A capacitor circuit, for example, can store the energy and dissipate the energy when enough power has been stored. Microprocessor may have to regulate the output of forces to assure that time is allowed for power to be stored. This power storage embodiment can also be used in non-USB embodiments of interface device 14 to allow a smaller power supply 40 to be used.

Safety switch 41 is preferably included in interface device to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In the preferred embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is open.

For example, a preferred embodiment of safety switch is an optical switch located on user object 34 (such as a joystick) or on a convenient surface of a housing enclosing interface device 14. When the user covers the optical switch with a hand or finger, the sensor of the switch is blocked from sensing light, and the switch is closed. The actuators 30 thus will function as long as the user covers the switch. Such an optical switch can comprise an ambient light detector, which simply senses when detected ambient light has been blocked by the user when the user covers the detector with a hand. Alternatively, an emitter/detector pair can be provided in a small recess on the interface device 14. The emitter emits a particular type of electromagnetic radiation, such as infrared light, out away from the interface device into exterior space. When the user covers the recessed emitter/detector, the emitted radiation reflects from the user's hand or finger so that the detector detects the radiation and activates the motors. Such optical switches are well known to those skilled in the art. Other types of safety switches 41 can be provided in other embodiments. For example, an electrostatic contact switch can be used to sense contact with the user, a button or trigger can be pressed, or a different type of sensor or switch can be used.

In the preferred embodiment, there is additionally included a "safety ramping routine" which the microprocessor 26 implements when the safety switch 41 is opened and closed. When the safety switch 41 is opened, the forces output by actuators 30 are dropped to zero instantly. However, when the safety-switch is then closed by the user, the output forces jump back up to the same magnitude that these forces were at before the safety switch was opened. This instant increase in the magnitude of forces creates a hazardous condition for the user. To counter this effect, the microprocessor preferably accesses a safety ramping routine in memory 27 that instructs the microprocessor to slowly ramp up the magnitude of the forces over a predefined time interval after the safety switch is closed. After the predefined time interval (e.g., 3 seconds), the forces are output at the full magnitude provided before the switch was opened.

User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, hand/foot pedal, medical instrument (laparoscope, catheter, etc.), pool cue, hand grip, knob, button, or other article.

Figure 2:
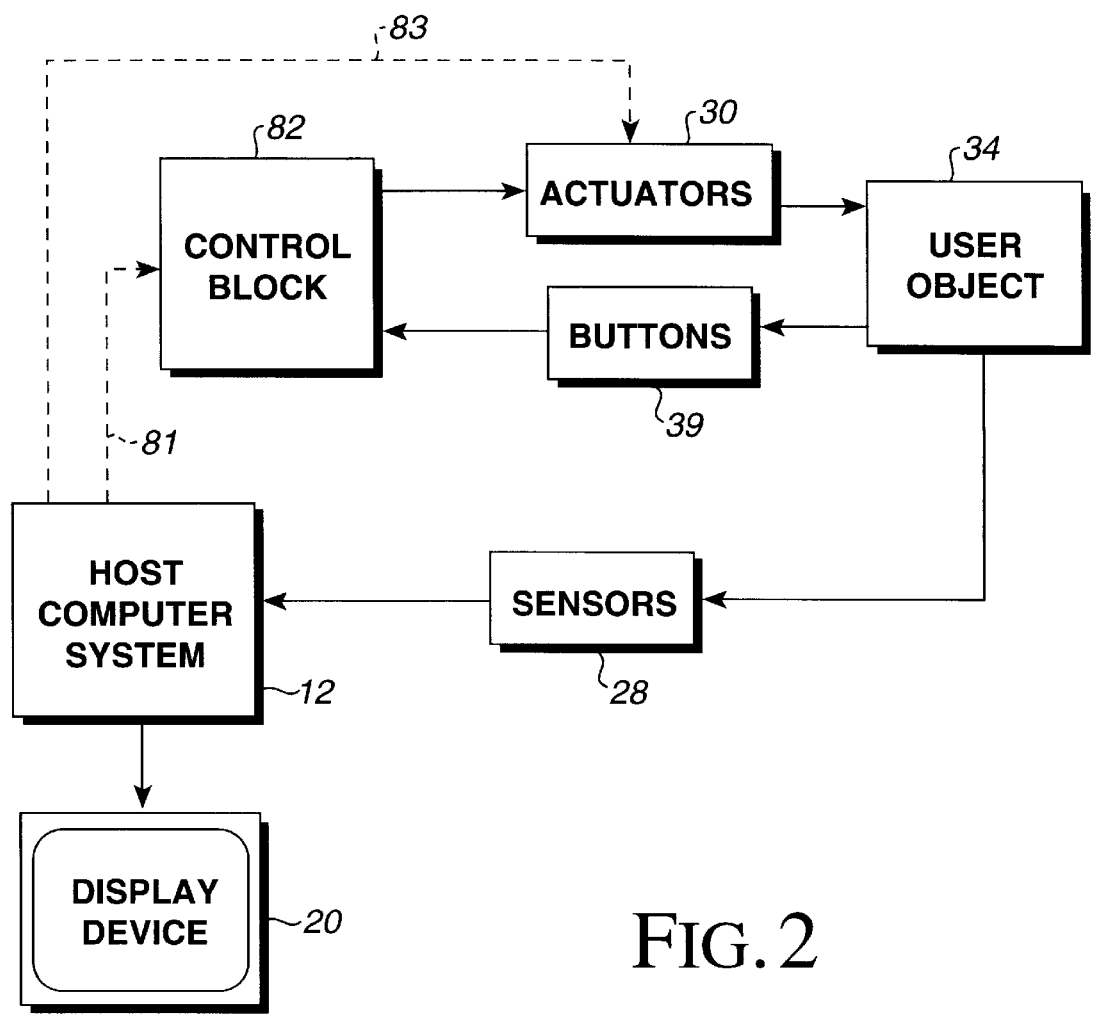
FIG. 2 is a block diagram of an alternative low-cost "recoil" embodiment of the interface device of FIG. 1.

FIG. 2 is a block diagram of an alternate "recoil" embodiment 80 of the force feedback control system 10 of FIG. 1. In recoil control system 80, a local device microprocessor 26 is not necessary to provide force feedback and the host computer sends no signals, or only minimal signals, to the interface device 14. The recoil embodiment is thus a "reflex" interface device, in that forces are output on user object 34 independently of host computer 12, and these forces depend only on local control events (e.g. a press of a button by the user). The reflex process includes outputting a force when a button is pressed with no communication from the host.

The position of user object 34 is sensed by sensors 28, and the sensors send position or other related signals to the host computer 12. The control loop includes buttons or other input devices 39, which sense actions of the user such as when the user pushes one of the buttons. The buttons 39 provide input signals to a recoil reflex control block 82, which is "hard wired" logic or other components instead of a microprocessor. The control block 82 sends activation signals to motor (or other type of actuator) 30, which outputs forces on user object 34 to complete the loop. In alternate embodiments, the host computer 12 can additionally provide simple enable signals on line 81 to the control block 82 or activation signals on line 83 to actuator 30 to provide more realistic force feedback. Since the host computer is not included in the main control loop, the host can devote minimal processing time to the control of force feedback and can process other tasks more efficiently, such as displaying images on display device 20 and other processes. In addition, the lack of a microprocessor 26 simplifies and reduces the cost of the interface device 14. Recoil embodiments are described in greater detail in parent Pat. No. 5,691,898.

Figure 3:
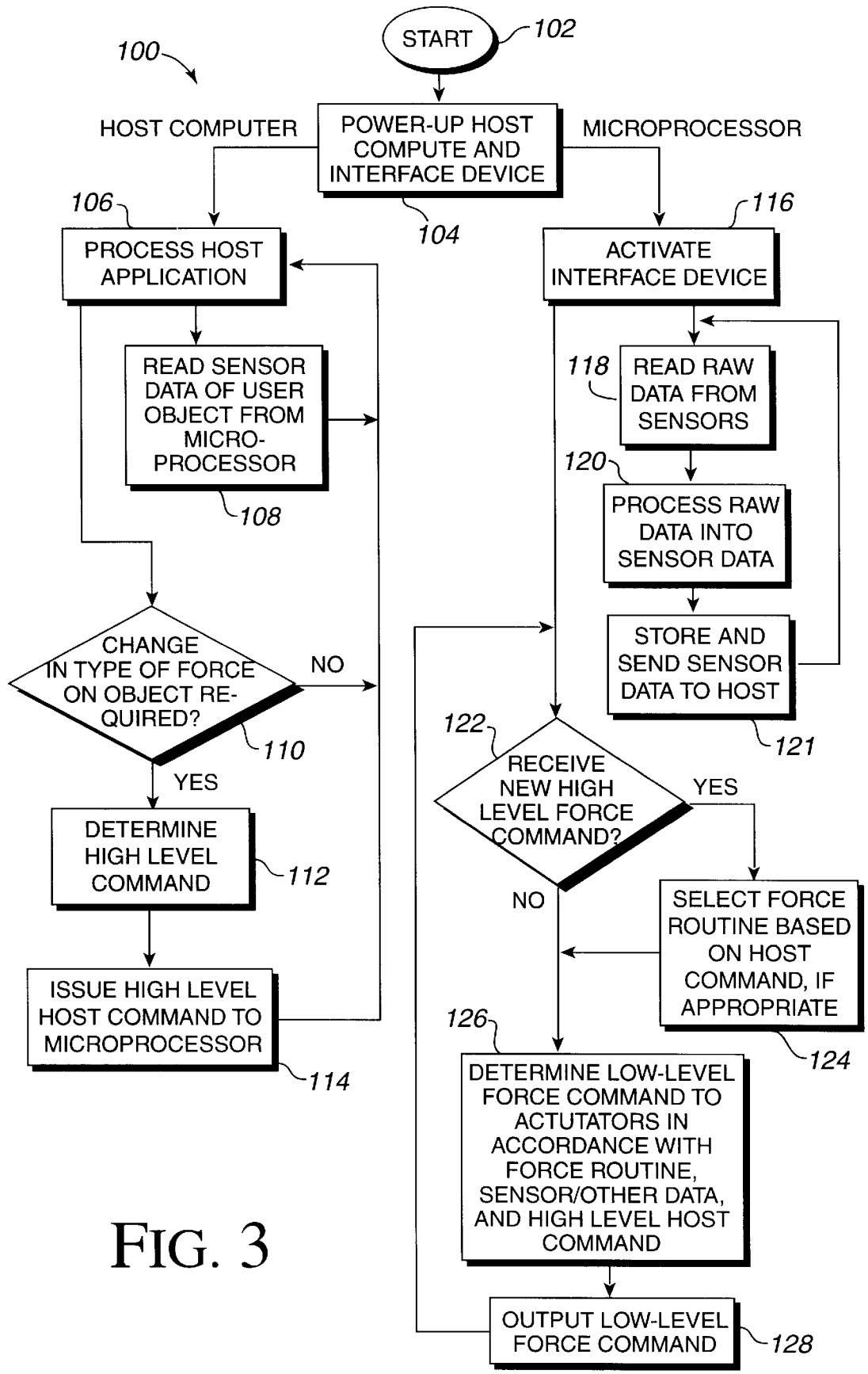
FIG. 3 is a flow diagram illustrating an embodiment of a method of the present invention for controlling a force feedback interface device.

FIG. 3 is a flow diagram illustrating a method 100 for controlling a force feedback interface device of the present invention using microprocessor 26, such as in the interface devices as described with respect to FIG. 1 or FIG. 2.

The process of FIG. 3 is suitable for low speed communication interfaces, such as a standard RS-232 serial interface. However, the embodiment of FIG. 3 is also suitable for high speed communication interfaces such as USB, since the local microprocessor relieves computational burden from host processor 16. In addition, this embodiment can provide a straightforward command protocol, an example of which is described with respect to patent Pat. No. 5,734,373 incorporated by reference herein, and which allows software developers to easily provide force feedback in a host application. In this reflex embodiment, for example, the slower "interrupt data transfers" mode of USB can be used.

The process of FIG. 3 begins at 102. In step 104, host computer system 12 and interface device 14 are powered up, for example, by a user activating power switches. After step 104, the process 100 branches into two parallel (simultaneous) processes. One process is implemented on host computer system 12, and the other process is implemented on local microprocessor 26. These two processes branch out of step 104 in different directions to indicate this simultaneity.

In the host computer system process, step 106 is first implemented, in which an application program is processed or updated. This application can be a simulation, video game, scientific program, operating system, or other software program. Images can be displayed for a user on output display screen 20 and other feedback can be presented, such as audio feedback.

Two branches exit step 106 to indicate that there are two processes running simultaneously (e.g., multi-tasking, etc.) on host computer system 12. In one of the processes, step 108 is implemented, where sensor data describing the user object is received by the host computer from local microprocessor 26. The local processor 26 continually receives raw data from sensors 28, processes the raw data, and sends processed sensor data to host computer 12. Alternatively, local processor 26 sends raw data directly to host computer system 12. "Sensor data," as referred to herein, can include position values, velocity values, and/or acceleration values derived from the sensors 28 which describe motion of object 34 in one or more degrees of freedom. In addition, any other data received from other input devices 39 can also be considered "sensor data" in step 108, such as signals indicating a button on interface device 14 has been pressed by the user. Finally, the term "sensor data" also can include a history of values, such as position values recorded previously and stored in order to calculate a velocity.

Host computer system 12 receives either raw data (e.g., position data and no velocity or acceleration data) or processed sensor data (position, velocity and/or acceleration data) from microprocessor 26 in step 108. In addition, any other sensor data received from other input devices 39 can also be received by host computer system 12 from microprocessor 26 in step 108, such as signals indicating a button on interface device 14 has been pressed by the user. The host computer does not need to calculate force values from the received sensor data in step 108. Rather, host computer 12 monitors the sensor data to determine when a change in the type of force is required. This is described in greater detail below. Of course, host computer 12 also uses the sensor data as input for the host application to update the host application accordingly.

After sensor data is received in step 108, the process returns to step 106, where the host computer system 12 can update the application program in response to the user's manipulations of object 34 and any other user input received as sensor data in step 108 as well as determine if one or more force commands need to be output to object 34 in the parallel process (step 110). Step 108 is implemented in a continual loop of receiving sets of sensor data from local processor 26. Since the host computer does not need to directly control actuators based on sensor data, the sensor data can be provided to the host at a low speed. For example, since the host computer updates the host application and images on display screen 20 in response to sensor data, the sensor data need only be read at 60–80 Hz (the refresh cycle of a typical display screen) compared to the much higher rate of about 500–1000 Hz (or greater) that would be required to realistically control force feedback signals directly from the host.

The second branch from step 106 is concerned with the process of the host computer determining high-level or supervisory force commands ("host commands") to provide force feedback to the user manipulated object 34.

The second branch starts with step 110, in which the host computer system checks if a change in the type of force applied to user object 34 is required. The "type" of force is intended to generically refer to different force sensations, durations, directions, or other high-level characteristics of forces, or changes in these characteristics, which are controlled by the host computer. For example, a force sensation or profile are types of forces produced by a particular force routine which the local microprocessor 26 can implement independently of the host computer.

The host computer 12 determines whether a change in the type of force is required according to several criteria, the most important of which are the sensor data read by the host computer 12 in step 108, timing data, and the implementation or "events" of the application program updated in step 106. The sensor data read in step 108 informs the host computer how the user is interacting with the application program and when new types of forces should be applied to the object based on the object's current position, velocity, and/or acceleration. The user's manipulations of object 34 may have caused a new type of force to required. For example, if the user is moving a virtual race car within a virtual pool of mud in a video game, a damping type of force should be applied to the object 34 as long as the race car moves within the mud. Thus, damping forces need to be continually applied to the object, but no change in the type of force is required. When the race car moves out of the pool of mud, a new type of force (i.e. a removal of the damping force in this case) is required. The velocity and/or acceleration of the user object can also influence whether a change in force on the object is required. If the user is controlling a tennis racket in a game, the velocity of a user object joystick may determine if a tennis ball is hit and thus if an appropriate force should be applied to the joystick.

Other criteria for determining if a change in the type of force is required includes events in the application program. For example, a game application program may (perhaps randomly) determine that another object in the game is going to collide with a computer object controlled by the user, regardless of the position of the user object 34. Forces should thus be applied to the user object in accordance with this collision event to simulate an impact. A type of force can be required on the user object depending on a combination of such events and the sensor data read in step 108. Other parameters and inputs to the application program can determine if a change in force to the user object is necessary, such as other input devices or user interface devices connected to host computer system 12 which input data to the application program (other interface devices can be directly connected, connected remotely through a network, etc.).

If no change in the type of force is currently required in step 110, then the process returns to step 106 to update the host application and return to step 110 to again check until such a change the type of force is required. When such a change is required, step 112 is implemented, in which host computer 12 determines an appropriate high-level host command to send to microprocessor 26. The available host commands for host computer 12 may each correspond to an associated force routine implemented by microprocessor 26. For example, different host commands to provide a damping force, a spring force, a gravitational pull, a bumpy surface force, a virtual obstruction force, and other forces can be available to host computer 12. These host commands can also include a designation of the particular actuators 30 and/or degrees of freedom which are to apply this desired force on object 34. The host commands can also include other command parameter information which might vary the force produced by a particular force routine. For example, a damping constant can be included in a host command to designate a desired amount of damping force, or a direction of force can be provided. The host command may also preferably override the reflex operation of the processor 26 and include "low-level" force commands or force signals, such as direct force values, that can be sent directly to the actuators 30 (described below with respect to step 126).

A preferred command protocol and detailed description of a set of host commands is described in Pat. No. 5,734,373. Preferably, the commands include direct host commands, "reflex" commands, and custom profile commands. Some desirable direct host commands include JOLT (a short force pulse), WOBBLE (random force), SPRING (a virtual spring), DAMPER (a damping force), and so on. Each command preferably includes parameters which help the host specify the characteristics of the desired output force. These commands would cause the microprocessor to instantly output the commanded force according to the appropriately-selected force routine. "Reflex" commands, in contrast, provide conditions to the microprocessor so that the desired force is output when the conditions are met. For example, a reflex command of $Jolt_{13}Button_{13}Reflex$ can instruct the microprocessor to select a force routine that outputs a JOLT force only when a specified button is pressed by the user (or, when the user object is moved in a particular direction). Finally, custom profiles can be provided to the microprocessor by the host and then commanded to be output. For example, the host computer can download to the microprocessor a set of force values (a force profile) as a "force profile file" or other collection of data using a host command $LOAD_{13}PROFILE$, and which can be stored in local memory 27. A separate host command $PLAY_{13}$ PROFILE could then be sent to instruct the microprocessor to output the downloaded force profile as forces on user object 34. Reflex commands can also be used to cause the downloaded profile to be output only when a condition, such as a button press, occurs. Preferably, a force profile file includes an array of force values, size information about the size of the data, and timing information for when to output the various force values (preferably, the force values have "+" or "−" signs to indicate the direction of forces; alternatively, directions can be separately indicated). Numerous force profile files can be downloaded to the microprocessor, and the microprocessor can send back an index or other information to inform the host how to select a particular force profile file. Custom effects can also be downloaded over a computer network, such as the World Wide Web, as described below.

In next step 114, the host computer sends the host command to the microprocessor 26 over bus 24 (or bus 25, if appropriate). The process then returns to step 106 to update the host application and to return to step 110 to check if another change in force is required.

In addition, the host computer 12 preferably synchronizes any appropriate visual feedback, auditory feedback, or other feedback related to the host application with the issuance of host commands and the application of forces on user object 34. For example, in a video game application, the onset or start of visual events, such as an object colliding with the user on display screen 20, should be synchronized with the onset or start of forces felt by the user which correspond to or complement those visual events. The onsets visual events and force events are preferably occur within about 30 milliseconds (ms) of each other. This span of time is the typical limit of human perceptual ability to perceive the events as simultaneous. If the visual and force events occur outside this range, then a time lag between the events can usually be perceived. Similarly, the output of auditory signals, corresponding to the onset of auditory events in the host application, are preferably output synchronized with the onset of output forces that correspond to/complement those auditory events. Again, the onsets of these events occur preferably within about 30 ms of each other. For example, host computer system 12 can output sounds of an explosion from speakers 21 as close in time as possible to the forces felt by the user from that explosion in a simulation. In some embodiments, the magnitude of the sound is in direct (as opposed to inverse) proportion to the magnitude of the forces applied to user object 34.

The second process branching from step 104 is implemented by the local microprocessor 26. This process starts with step 116 and is implemented in parallel with the host computer process of steps 106–114 described above. In step 116, the interface device 14 is activated. For example, signals can be sent between host computer 12 and interface device 14 to acknowledge that the interface device is now active and can be commanded by host computer 12. From step 116, two processes branch to indicate that there are two processes running simultaneously (e.g., multi-tasking) on local microprocessor 26.

In the first process branch, step 118 is implemented, in which the processor 26 reads raw data (sensor readings) from sensors 28. Such raw data preferably includes position values describing the position of the user object along provided degrees of freedom. In the preferred embodiment, sensors 28 are relative sensors that provide position values describing the change in position since the last position read. Processor 26 can determine the absolute position by measuring the relative position from a designated reference position. Alternatively, absolute sensors can be used. In other embodiments, sensors 28 can include velocity sensors and accelerometers for providing raw velocity and acceleration values of object 34. The raw data read in step 118 can also include other input, such as from an activated button or other control 39 of interface device 14.

In other embodiments such as the interface device of FIG. 1, either raw data or processed sensor data from sensors 28 can be sent directly to host computer 12 without being received by microprocessor 26. The host can perform any processing that is necessary to interpret the sensor data in these embodiments, such that any or all of steps 118–121 may not be necessary.

In next step 120, microprocessor 26 processes the received raw data into sensor data, if applicable. In the preferred embodiment, this processing includes two steps: computing velocity and/or acceleration values from raw position data (if velocity and/or acceleration are needed to compute forces), and filtering the computed velocity and acceleration data. The velocity and acceleration values are computed from raw position data received in step 118 and a history of stored position and time values (and other types of values, if appropriate). Preferably, processor 26 stores a number of position values and time values corresponding to when the position values were received. Processor 26 can use, for example, local clock 21 to determine the timing data. The velocity and acceleration can be computed using the stored position data and timing data, as is well known to those skilled in the art. The calculated velocity and/or acceleration values can then be filtered to remove noise from the data, such as large spikes that may result in velocity calculations from quick changes in position of object 34. Thus, the sensor data in the described embodiment includes position, velocity, acceleration, and other input data. In an alternate embodiment, circuitry that is electrically coupled to but separate from processor 26 can receive the raw data and determine velocity and acceleration. For example, an application-specific integrated circuit (ASIC) or discrete logic circuitry can use counters or the like to determine velocity and acceleration to save processing time on microprocessor 26. In embodiments where velocity and/or acceleration sensors are used, the calculation of velocity and/or acceleration is omitted.

In next step 121, the processor 26 sends the processed sensor data to host computer 12 and also stores histories of the sensor data in storage devices such as memory 27 for computing forces. The process then returns to step 118 to read raw data. Steps 118, 120 and 121 are thus continuously implemented to provide current sensor data to processor 26 and host computer 12.

The second branch from step 116 is concerned with a "reflex process" or "reflex" in which microprocessor 26 controls the actuators 30 to provide forces to object 34. As mentioned above, a "reflex process" is a force process that outputs forces on user object 34 and is implemented locally to interface device 14, is independent of host computer 12, and depends only on local control events, such as buttons being pressed or user object 34 being moved by the user. The most simple form of reflex is used in the "recoil" embodiment of FIG. 2, in which a simple control event, such as the push of a button by the user, causes a force to be output on the user object by actuators 30. The more complex form of reflex process, described in the current method, can calculate and output forces depending on a variety of local control events, such as button presses and the position, velocity, and/or acceleration of user object 34 in provided degrees of freedom.

The second branch starts with step 122, in which processor 26 checks if a host command has been received from host computer 12 over bus 24. Host commands are high-level commands that command changes in forces to the user object, as described with reference to step 114. If a host command has been received, the process continues to step 124, where a "force routine" indicated by or associated with the host command is selected if appropriate. A "force routine", as referred to herein, is a set of steps or instructions for microprocessor 26 to provide low-level force commands to actuators 30. These "low-level" force commands (or "force signals") are to be distinguished from the "high-level" host commands issued from the host computer 12. A force signal instructs an actuator to output a force of a particular magnitude. For example, the low level command typically includes a "force value" or magnitude e.g., equivalent signal(s) to instruct the actuator to apply a force of a desired magnitude value. Low-level commands may also designate a direction of force if an actuator can apply force in a selected direction, and/or other low-level information as required by an actuator.

Force routines determine force signals from other parameters, such as sensor data read in step 118 (button press data, position data, etc.) and timing data from clock 18. The force routines can be stored local to microprocessor 26 in, for example, memory 27 such as RAM or ROM (or EPROM, EEPROM, etc.). Thus, the microprocessor might select a particular damping force routine if the host command indicated that the damping force from that particular damping process should be applied to object 34. Other damping force routines might also be available. The available force routines are described in greater detail below and may include algorithms, stored force profiles or values, conditions, etc. Also, the host command received from the host in step 122 may in some instances simply be a force signal, or even a single force value, that is to be sent to an actuator 30 as a low level command, in which case a force routine need not be selected.

After a force routine has been selected in step 124, or if a new host command has not been received in step 122, then step 126 is implemented, in which processor 26 determines a low-level force command or "force signal." The low-level command is derived from either a selected force routine, a resident force routine, any other data required by the force routine, and/or command parameters and/or values included in relevant host commands. As explained above, the required data can include sensor data and/or timing data from local clock 29. If no new host command was received in step 122, then the microprocessor 26 can determine a force signal according to one or more "resident" force routines, i.e., the same force routines that it selected and used in previous iterations of step 126. This is the "reflex" process operation of the interface device that does not require any new input from host computer 12.

In the described embodiment, force routines can include several different types of steps and/or instructions which are followed to determine a low-level force command. One type of instruction in a force routine is a force algorithm, which includes an equation that host computer 12 can use to calculate or model a force value based on sensor and timing data. Several types of algorithms can be used. For example, algorithms in which force varies linearly (or nonlinearly) with the position of object 34 can be used to provide a simulated force like a spring. Algorithms in which force varies linearly (or nonlinearly) with the velocity of object 34 can be also used to provide a simulated damping force or other forces on user object 34. Algorithms in which force varies linearly (or nonlinearly) with the acceleration of object 34 can also be used to provide, for example, a simulated inertial force on a mass (for linear variation) or a simulated gravitational pull (for nonlinear variation). Several types of simulated forces and the algorithms used to calculate such forces are described in "Perceptual Design of a Virtual Rigid Surface Contact," by Louis B. Rosenberg, Center for Design Research, Stanford University, Report number AL/CF-TR-1995-0029, Apr. 1993, which is incorporated by reference herein.

For example, a kinematic equation which calculates a force value based on the velocity of the user object multiplied by a damping constant can be used to determine a damping force on the user object. This type of equation can simulate motion of object 34 along one degree of freedom through a fluid or similar material. A procedure for calculating a damping force on object 34 is described in Pat. No. 5,767,839, filed Mar. 3, 1995, entitled "Method and Apparatus for Providing Passive Force Feedback", which is incorporated by reference herein. For example, a damping constant can first be selected which indicates the degree of resistance that object 34 experiences when moving through a simulated material. Movement in mediums such as a fluid, a bumpy surface, on an inclined plane, etc., can be simulated using different methods of calculating the low-level force commands.

The determination of low-level commands from force routines can also be influenced by timing data accessed from system clock 18. For example, in the damping force example described above, the velocity of the user object 34 is determined by calculating the different of positions of the user object and multiplying by the damping constant. This calculation assumes a fixed time interval between data points, i.e., it is assumed that the position data of the object 34 is received by host computer 12 in regular, predetermined time intervals. However, this may not actually occur due to different processing speeds of different computer platforms or due to processing variations on a single host microprocessor 16, such as due to multitasking. Therefore, in the present invention, the host computer preferably accesses clock 12 to determine how much time has actually elapsed since the last position data was received. In the damping force example, the host computer could take the difference in position and divide it by a time measure to account for differences in timing. The host computer can thus use the clock's timing data in the modulation of forces and force sensations to the user. Timing data can be used in other algorithms and force sensation processes of the present invention to provide repeatable and consistent force feedback regardless of type of platform or available processing time on host computer 12.

The velocity and acceleration required for particular force routines can be provided in a number of different ways. The sensor data provided by steps 118–121 can include position data, velocity data, and/or acceleration data. For example, the microprocessor can use the velocity and acceleration data directly in an algorithm to calculate a low-level force command. In an alternate embodiment, only position data might be received from sensors 28, and the microprocessor can calculate the velocity and/or acceleration values using stored histories of values. The microprocessor only calculates the velocity and/or acceleration values when the values are needed by a force routine. Alternatively, the processor can always calculate the velocity and acceleration values regardless of whether the values are used in a force routine.

Other instructions can also be included in a force routine. For example, conditional steps can be included to provide forces under specified circumstances. For example, a force routine might instruct the processor 26 to output a low-level force command only when the user object is moved to a particular position in provided degrees of freedom. Or, to simulate a virtual obstruction such as a wall, forces should be applied in only one direction (uni-directional). For many passive actuators, only bi-directional resistance forces can be applied. To simulate uni-directional resistance using a passive actuator, conditional instructions can be included in a virtual obstruction force routine to output a forces only when the user object is moved in a particular direction at a particular position. Also, a "null" force routine can be available that instructs microprocessor 26 to issue low-level commands to provide zero force (i.e. remove all forces) on user object 34.

Another type of force routine does not use algorithms to model a force, but instead uses force values that have been previously calculated or sampled and stored as a digitized "force profile" in memory or other storage device. These force values may have been previously generated using an equation or algorithm as described above, or provided by sampling and digitizing forces. For example, to provide a particular force sensation to the user, host computer 12 can be instructed by the steps of a force routine to retrieve successive force values of a force profile from a certain storage device, such as memory 27, RAM, hard disk, etc. These force values can be included in low-level commands sent directly to an actuator to provide particular forces without requiring host computer 12 to calculate the force values. In addition, previously stored force values can be output with respect to other parameters to provide different types of forces and force sensations from one set of stored force values. For example, using system clock 18, one set of stored force values can be output in sequence according to different time intervals that can vary depending on the desired force, thus producing different types of forces on the user. Or, different retrieved force values can be output depending on the current position, velocity, etc. of user object 34.

The low level force command determined in step 126 can also depend on instructions that check for other parameters. These instructions can be included within or external to the above described force routines. One such parameter can includes values provided by the implemented host application program. The application program may determine that a particular low-level force command should be output or force routine selected based on events occurring within the application program or other instructions. Host commands can be provided by the host application program to output forces independently of sensor data. Also, in a host command, the host can provide its own particular position, velocity, and/or acceleration data to a designated force routine to calculate or provide a force that is not based on the manipulation of user object 34, but is provided to simulate an event in the application program. Such events may include collision events, such as occur when a user-controlled computer image impacts a virtual surface or structure. Also, other input devices connected to host computer 12 can influence events and, therefore, the forces applied to user object 34, such as multiple interface devices 14 connected to a single host computer.

Also, the low-level force commands determined in step 126 can be based on other inputs to host computer 12, such as activations of buttons or other input devices in (or external to) interface device 14. For example, a particular force routine might instruct the microprocessor to output a force to a joystick whenever a user presses a button on the joystick. In some embodiments, steps 118, 120, and 121 for reading sensor data can be incorporated in one or more force routines for the microprocessor, so that sensor data is only read once a force routine has been selected and executed. In addition, the host command can include other command parameter information needed to determine a low-level force command. For example, the host command can indicate the direction of a force along a degree of freedom.

Microprocessor 26 can determine a low-level force command in step 126 according to a newly-selected force routine, or to a previously selected force routine. For example, if this is a second or later iteration of step 126, the same force routine as in the previous iteration can be again implemented if a new host command has not been received. This is, in fact, the advantage of an independent reflex process: the microprocessor 26 can continually output forces on user object 34 using sensor data and timing data according to force routines, independently of any commands from the host. Thus, a "virtual wall" force routine would allow the microprocessor to command forces simulating the wall whenever the user's joystick was moved in the appropriate position or direction without intervention of the host.

The above-described force routines and other parameters can be used to provide a variety of haptic sensations to the user through the user object 34 to simulate many different types of tactile events. For example, typical haptic sensations may include a virtual damping (described above), a virtual obstruction, and a virtual texture. Virtual obstructions are provided to simulate walls, obstructions, and other unidirectional forces in a simulation, game, etc. When a user moves a computer image into a virtual obstruction with a joystick, the user then feels a physical resistance as he or she continues to move the joystick in that direction. If the user moves the object away from the obstruction, the unidirectional force is removed. Thus the user is given a convincing sensation that the virtual obstruction displayed on the screen has physical properties. Similarly, virtual textures can be used to simulate a surface condition or similar texture. For example, as the user moves a joystick or other user object along an axis, the host computer sends a rapid sequence of commands to repetitively 1) apply resistance along that axis, and 2) to then immediately apply no resistance along that axis, e.g., as according to a force routine. This frequency is based upon the travel of the joystick handle and is thus correlated with spatial position. Thus, the user feels a physical sensation of texture, which can be described as the feeling of dragging a stick over a grating.

In step 128, processor 26 outputs the determined processor force command to actuators 30 to set the output force to the desired level. Before sending out the low-level force command, processor 26 can optionally convert the low-level force command to an appropriate form usable by actuator 30, and/or actuator interface 38 can perform such conversion. The process then returns to step 122 to check if another host command has been received from the host computer 12.

The reflex process of microprocessor 26 (steps 118, 120, 122, 124, 126, and 128) thus operates to provide forces on object 34 independently of host computer 12 according to a selected force routine and other parameters. The force routine instructs how the processor force command is to be determined based on the most recent sensor data read by microprocessor 26. Since a reflex process independently outputs forces depending on the local control events of interface device 14, the host computer is freed to process the host application and determine only when a new type of force needs to be output. This greatly improves communication rates between host computer 12 and interface device 14.

In addition, the host computer 12 preferably has the ability to override the reflex operation of microprocessor 26 and directly provide force values or low level commands. For example, the host command can simply indicate a force value to be sent to an actuator 30. This override mode can also be implemented as a force routine. For example, the microprocessor 26 can select a force routine from memory that instructs it to relay low-level force commands received from host computer 12 to an actuator 30.

Another advantage of the reflex embodiment is that the low communication needs between the host computer and the interface device allows force feedback to be easily implemented over computer networks. For example, host computer 12 can be connected to the Internet and the World Wide Web networks as is well known to those skilled in the art. A "web page" or other network site or node can store force feedback information for a user to download and implement using interface device 14. Such an embodiment is described in greater detail in copending patent application Ser. No. 08/691,852, incorporated by reference herein in its entirety.

In other embodiments, a "host-controlled" method can be used, in which host computer system 12 provides direct, low-level force commands to microprocessor 26, and the microprocessor directly provides these force commands to actuators 30 to control forces output by the actuators. Such an embodiment is described in greater detail in Pat. Nos. 5,739,811 and 5,734,373 both incorporated by reference herein. However, this type of embodiment is not a reflex embodiment since forces output on user object 34 are dependent on active and continuous control from the host computer, which increases the computational burden on the host.

The control process for a host controlled embodiment would be similar to the process of FIG. 3, except the host computer 12 would determine all forces to be output on user object 34. Sensor data is received by the host computer from local microprocessor 26. Processor 26 continually receives signals from sensors 28, processes the raw data, and sends processed sensor data to host computer 12. Alternatively, the processor 26 can provide raw position data and other input data to host computer 12, and the host computer 12 filters and computes velocity and acceleration from the raw position data. In other embodiments, the filtering can be performed on host computer 12 while the other processing can be performed on the processor 26.

In the host-controlled embodiment, the host computer determines the low-level force commands to provide force feedback to the user manipulating object 34. Preferably, force routines are used by the host which are provided local to the host and which are similar to the force routines used by microprocessor 26 as described above. The host computer checks the sensor data to determine if a change in low-level force applied to user object 34 is required. For example, if the user is controlling a simulated race car in a video game, the position of a joystick determines if the race car is moving into a wall and thus if a collision force should be generated on the joystick.

When a change in force is required, host computer 12 outputs appropriate low-level force commands to microprocessor 26 over bus 24. These low-level force commands may include one or more force values and/or directions that were determined in accordance with the parameters described above. The force command can be output as an actual force signal that is merely relayed to an actuator 30 by microprocessor 26; or, the force command can be converted to an appropriate form by microprocessor 26 before being sent to actuator 30. In addition, the low-level force command preferably includes information indicating to microprocessor 26 which actuators are to receive this force value. The host application program is then processed/updated. If no change of force is required, host computer 12 need not issue another command, since microprocessor 26 can continue to output the previous low-level force command to actuators 30. Alternatively, host computer 12 can continuously output low-level commands, even if no change of force is required.

Figure 4:
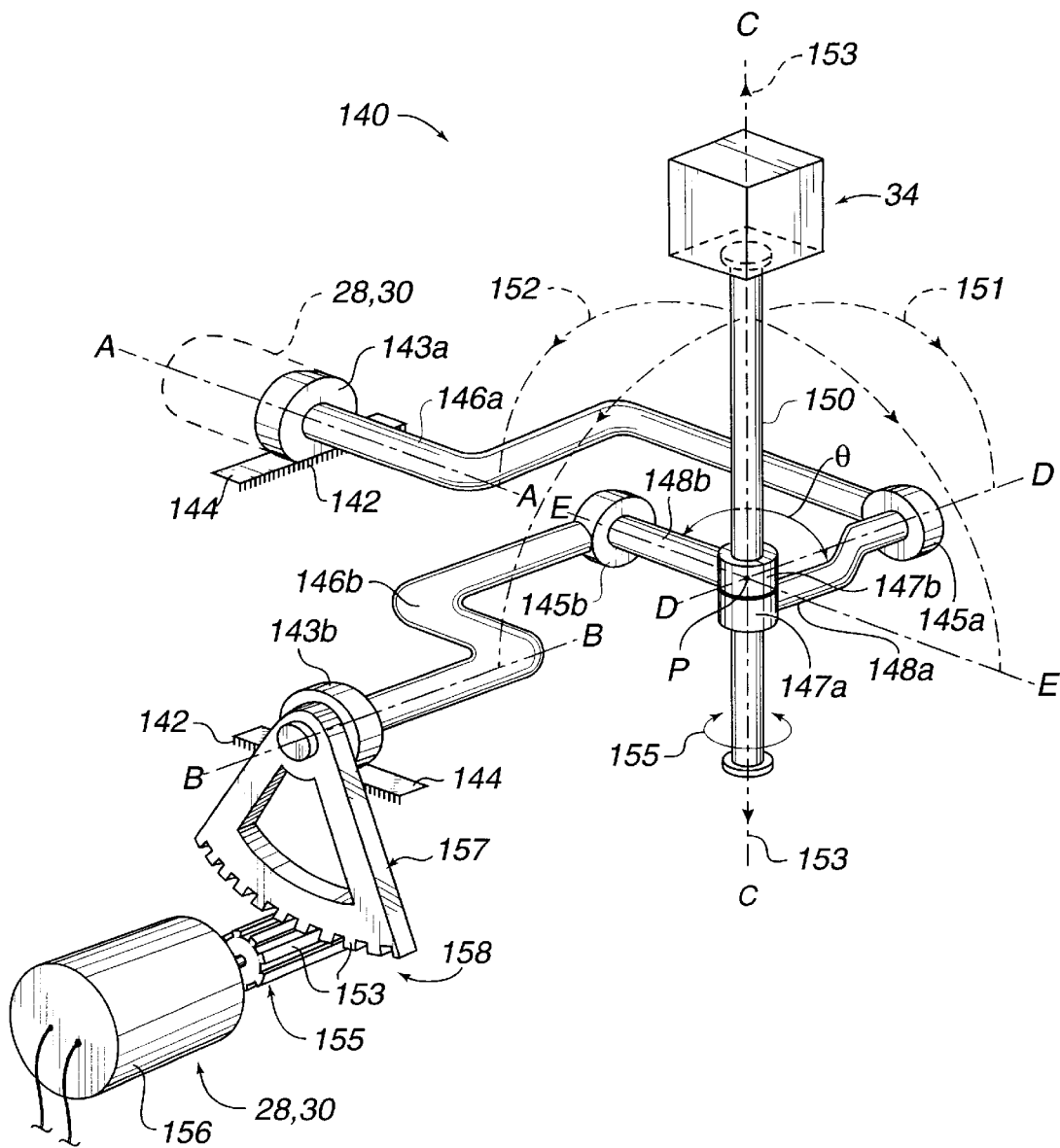
FIG. 4 is a schematic diagram of a five bar linkage mechanism for providing multiple degrees of freedom to the user object of the interface device.

FIG. 4 is a schematic diagram of an example of a user object 34 that is coupled to a mechanical apparatus 130, including gimbal mechanism 140 for providing two or more rotary degrees of freedom to object 34. Gimbal mechanism 140 can be coupled to interface device 14 or be provided with sensors 28 and actuators 30 separately from the other components of interface device 14. Implementation of gimbal mechanism 140 and other types of gimbal mechanisms suitable for use with the present invention, are described in greater detail in co-pending patent applications Ser. No. 08/560,091 filed on Nov. 17, 1995; Ser. No. 08/344,148 filed on Nov. 23, 1994 abandon; Ser. No. 08/664,086, filed Jun. 14, 1996 and Ser. No. 08/736,161 filed Oct. 25, 1996, and Pat. Nos. 5,731,804; 5,767,839; 5,721,566; and 5,623,582, all of which are hereby incorporated by reference herein.

Gimbal mechanism 140 can be supported by a grounded surface 142, which can be, for example, a surface of the housing of interface device 14 (schematically shown as part of member 144), a base, tabletop, or other surface that is fixed in position with reference to the user. Gimbal mechanism 140 is preferably a five-member linkage that includes a ground member 144, extension members 146a and 146b, and central members 148a and 148b. Ground member 144 is coupled to ground surface 142 which provides stability for mechanism 140. Ground member 144 is shown in FIG. 4 as two separate members coupled together through grounded surface 142, but is considered one "member" of the five member linkage.

The members of gimbal mechanism 140 are rotatably coupled to one another through the use of bearings or pivots, wherein extension member 146a is rotatably coupled to ground member 144 by bearing 143a and can rotate about an axis A, central member 148a is rotatably coupled to extension member 146a by bearing 145a and can rotate about a floating axis D, extension member 146b is rotatably coupled to ground member 144 by bearing 143b and can rotate about axis B, central member 148b is rotatably coupled to extension member 146b by bearing 145b and can rotate about floating axis E, and central member 148a is rotatably coupled to central member 148b by bearing 147 at a center point P at the intersection of axes D and E. Preferably, central member 148a is coupled to one rotatable portion 147a of bearing 47, and central member 148b is coupled to the other rotatable portion 147b of bearing 147. The axes D and E are "floating" in the sense that they are not fixed in one position as are axes A and B. As object 34 is moved about axis A, floating axis D varies its position, and as object 34 is moved about axis B, floating axis E varies its position. Axes A and B are substantially mutually perpendicular.

Gimbal mechanism 140 is formed as a five member closed chain or loop, such that a first member of the chain is coupled to the last member in the chain. Each end of one member is coupled to the end of another member. The five-member linkage is arranged such that extension member 146a, central member 148a, and central member 148b can be rotated about axis A in a first degree of freedom. The linkage is also arranged such that extension member 146b, central member 148b, and central member 148a can be rotated about axis B in a second degree of freedom. When object 34 is positioned at the "origin" as shown in FIG. 4, an angle θ between the central members 148a and 148b is about 90 degrees. When object 34 is rotated about one or both axes A and B, angle θ changes. For example, if the object 34 is moved into the page of FIG. 4 away from the viewer, or out of the plane of the page toward the viewer, then the angle θ will decrease. If the object is moved to the left or right as shown in FIG. 4, the angle θ increases.

Linear axis member 150 is preferably an elongated rod-like member which is coupled to central member 148a and central member 148b at the point of intersection P of axes A and B. Linear axis member 150 can be used as a shaft or portion of user object 34 or can be coupled to a different object 34. Linear axis member 150 is coupled to gimbal mechanism 140 such that it extends out of the plane defined by axis D and axis E. Linear axis member 150 can be rotated about axis A (and E) by rotating members 146a, 148a, and 148b in a first revolute degree of freedom, shown as arrow line 151, and can also be rotated about axis B (and D) by rotating members 150b, 148a, and 148b about axis B in a second revolute degree of freedom, shown by arrow line 152. In some embodiments, the linear axis member can also be translatably coupled to the ends of central members 148a and 148b, and thus can be linearly moved, independently with respect to the gimbal mechanism 140, along floating axis C, providing a third degree of freedom as shown by arrows 153. In addition, linear axis member 150 in some embodiments can rotated about axis C, as indicated by arrow 155, to provide an additional degree of freedom. These additional degrees of freedom can also be associated with additional sensors and actuators to allow processor 26/host computer 12 to read the position/motion of object 34 and apply forces in those degrees of freedom.

Also preferably coupled to gimbal mechanism 140 and/or linear axis member 150 are transducers, such as the sensors 28 and actuators 30 of FIG. 1. Such transducers are preferably coupled at the link or bearing points between members of the apparatus and provide input to and output from microprocessor 26 and/or host computer system 12. For example, a sensors/actuator transducer 156 can be coupled to extension member 146b by a gear drive 158. Gear drive 158 can include a drive wheel 155 and a rotatable cam 157 that interlock using gear teeth 153. Cam 157 is rigidly coupled to extension member 146b and is rotatable with the member 146b with respect to ground 142. Drive wheel is rigidly coupled to a rotating shaft of transducer 156 such that transducer 156 can rotate drive wheel 155, cam 157, and member 146b to output forces on user object 34 about axis B/D. Likewise, transducer 156 can sense rotation about axis B/D when member 146b, cam 157, and drive wheel 155 rotate. A similar gear drive system can be provided at bearing 143a to sense and actuate movement about axis A/E. In alternate embodiments, different drive systems and transducers, sensors, and actuators can be used, as described above with reference to FIGS. 1 and 5.

User object 34 is coupled to mechanism 140 and is preferably an interface object for a user to grasp or otherwise manipulate in three dimensional (3D) space. User object 34 may be moved in both (or all three or four) of the above-described degrees of freedom.

The preferred embodiment for gimbal mechanism 140 is for a joystick user object that can be moved in two rotary degrees of freedom about axes A/E and B/D. For example, linear axis member 150 can be replaced by a joystick handle that is rigidly coupled to central member 148b. Another preferred embodiment includes a third degree of freedom in which the joystick handle can rotate or "spin" about axis C. These embodiments are most appropriate for video games and certain virtual reality type applications such as controlling a vehicle, first person point of view, etc. Other embodiments include medical simulation and operation, for which the four degrees of freedom described above are more appropriate.

Figure 5:
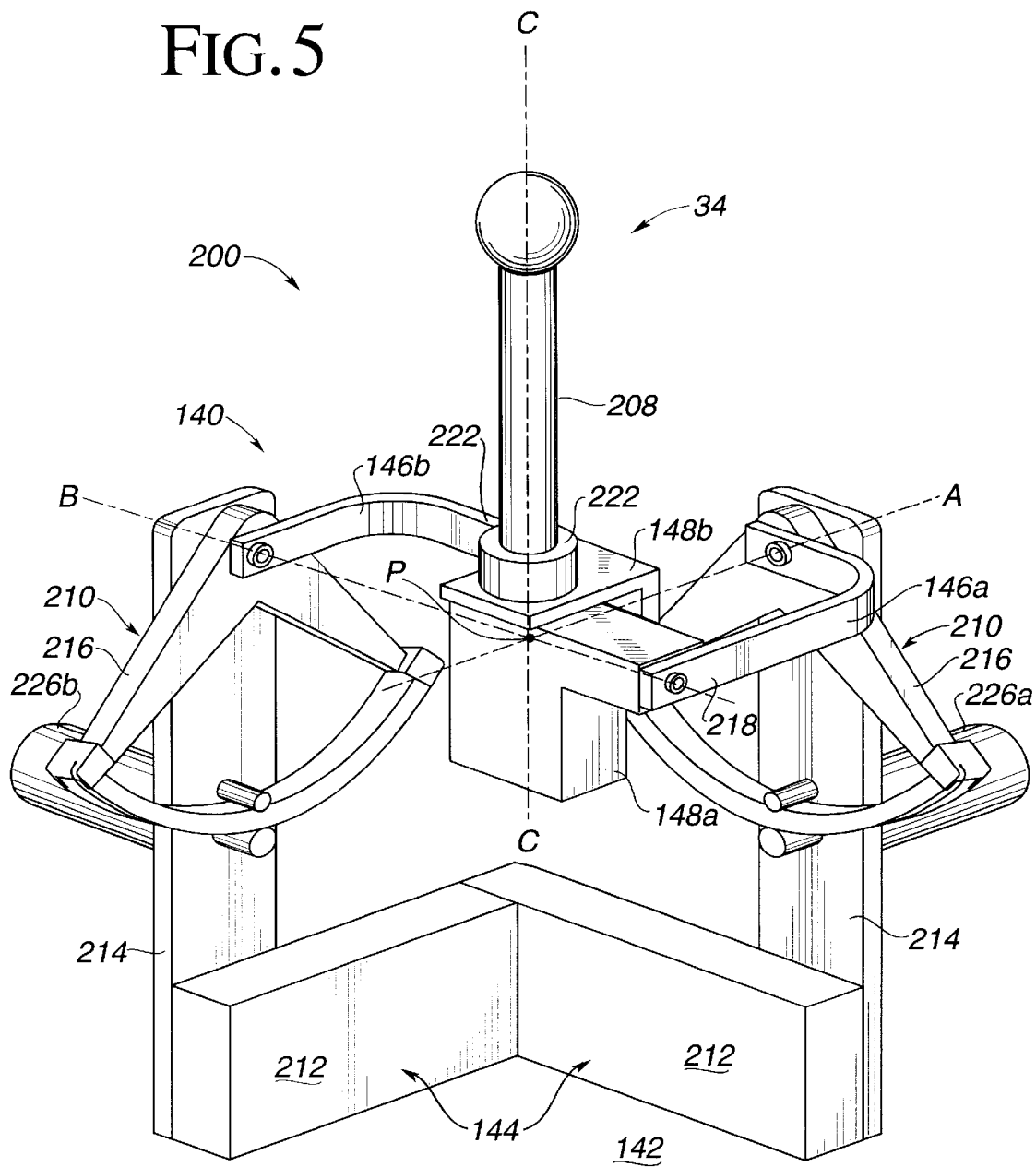
FIG. 5 is a perspective view of a preferred embodiment of the mechanical apparatus of FIG. 4.

FIG. 5 is a perspective view of a specific embodiment of a mechanical apparatus 200 for providing mechanical input and output to a computer system in accordance with the present invention. Apparatus 200 includes a gimbal mechanism 140 and transducers 206. A user object 34, shown in this embodiment as a joystick 208, is coupled to apparatus 200. Object 34 is shown in FIG. 5 as a joystick 208 but can be provided as many different types of objects or manipulandums, such as a mouse, joypad, medical instrument, steering wheel, pool cue, etc. Apparatus 200 operates in substantially the same fashion as apparatus 130 described with reference to FIG. 4. A linear axis member 150 (not shown) as shown in FIG. 4 can also be coupled to gimbal mechanism 140 at intersection point P and can be translated by a transducer using a capstan drive mechanism 210.

Gimbal mechanism 140 provides support for apparatus 200 on a grounded surface 142. Gimbal mechanism 140 includes a five member linkage including ground member 144, capstan drive mechanisms 210, extension members 146a and 146b, and central members 148a and 148b as described in FIG. 4. Ground member 144 includes a base member 212 and vertical support members 214. Base member 212 is coupled to grounded surface 142, and a vertical support member 214 is coupled to each of these outer surfaces of base member 212.

A capstan drive mechanism 210 is preferably coupled to each vertical member 214. Capstan drive mechanisms 210 are included in gimbal mechanism 140 to provide mechanical advantage without introducing friction and backlash to the system. A capstan drum 216 of each capstan drive mechanism is rotatably coupled to a corresponding vertical support member 214 to form axes of rotation A and B, which correspond to axes A and B as shown in FIG. 4. The capstan drive mechanisms 210 are described in greater detail with respect to FIG. 6.

Extension member 146a is rigidly coupled to capstan drum 216 and is rotated about axis A as capstan drum 216 is rotated. Likewise, extension member 146b is rigidly coupled to the other capstan drum 216 and can be rotated about axis B. Central member 148a is rotatably coupled to a long end 218 of extension member 146a and central member 148b is rotatably coupled to the long end 220 of extension member 146b. Central members 148a and 148b are rotatably coupled to each other at the center of rotation of the gimbal mechanism, which is the point of intersection P of axes A and B. Bearing 222 connects the two central members 148a and 148b together at the intersection point P. Gimbal mechanism 140 provides two degrees of freedom to an object positioned at or coupled to the center point P of rotation.

Transducers 226 are preferably coupled to gimbal mechanism 140 to provide input and output signals between mechanical apparatus 130 and computer 16. In the described embodiment, transducers 226 include two grounded transducers 226a and 226b. The housing of grounded transducer 226a is preferably coupled to vertical support member 214 and preferably includes both an actuator for providing force in or otherwise influencing the first revolute degree of freedom about axis A and a sensor for measuring the position of object 34 in or otherwise influenced by the first degree of freedom about axis A. A rotational shaft of actuator 226a is coupled to a pulley of capstan drive mechanism 210 to transmit input and output along the first degree of freedom. Grounded transducer 226b preferably corresponds to grounded transducer 226a in function and operation and influences or is influenced by the second revolute degree of freedom about axis B. In one embodiment, the two tranducers 226 are substantually mutually perpendicular due to their coupling to the surfaces of vertical support members 214.

Grounded transducers 226a and 226b preferably include sensors and actuators. The sensors can be, for example, relative optical encoders which provide signals to measure the angular rotation of a shaft of the transducer. The electrical outputs of the encoders are routed to microprocessor 26 and/or host computer 16 and are detailed with reference to FIG. 1. Other types of sensors can also be used, such as potentiometers, non-contact sensors, Polhemus (magnetic) sensors, optical sensors, etc.

Transducers 226a and 226b also preferably include actuators. Active actuators include linear current control motors, stepper motors, pneumatic/hydraulic active actuators, and other types of actuators that transmit a force to move an object, as described above with reference to FIG. 1. For example, active actuators can drive a rotational shaft about an axis in a rotary degree of freedom. An improved actuator of the present invention is preferably used with force feedback apparatuses and is described with reference to FIGS. 9a–c. In alternate embodiments, other types of active motors can also be used, such as a stepper motor, brushless DC motors, pneumatic/hydraulic actuators, a torquer (motor with limited angular range), or a voice coil. Passive actuators can also be employed, such as magnetic particle brakes, friction brakes, or pneumatic/hydraulic passive actuators, and/or passive (or "viscous") dampers provided on the bearings of apparatus 200.

The transducers 226a and 226b of the described embodiment are advantageously positioned to provide a very low amount of inertia to the user handling object 34. Transducer 226a and transducer 226b are decoupled, meaning that the transducers are both directly coupled to ground member 144 which is coupled to ground surface 142, i.e. the ground surface carries the weight of the transducers, not the user handling object 34. The weights and inertia of the transducers 226a and 226b are thus substantially negligible to a user handling and moving object 34. This provides a more realistic interface to a virtual reality system, since the computer can control the transducers to provide substantially all of the forces felt by the user in these degrees of motion. Apparatus 200 is a high bandwidth force feedback system, meaning that high frequency signals can be used to control transducers 226 and these high frequency signals will be applied to the user object with high precision, accuracy, and dependability. The user feels very little compliance or "mushiness" when handling object 34 due to the high bandwidth.

FIG. 6 is a perspective view of a capstan drive mechanism 210 shown in some detail. As an example, the drive mechanism 210 coupled to extension arm 146b is shown; the other capstan drive 210 coupled to extension arm 146a is substantially similar to the mechanism presented here. Capstan drive mechanism 210 includes capstan drum 216, capstan pulley 230, and stop 232. Capstan drum 216 is preferably a wedge-shaped member having leg portion 234 and a curved portion 236. Other shapes of drum 216 can also be used. Leg portion 234 is pivotally coupled to vertical support member 214 at axis B (or axis A for the opposing capstan drive mechanism). Extension member 146b is rigidly coupled to leg portion 234 such that when capstan drum 216 is rotated about axis B, extension member 146b is also rotated and maintains the position relative to leg portion 234 as shown in FIG. 5. Curved portion 236 couples the two ends of leg portion 234 together and is preferably formed in an arc centered about axis B. Curved portion 236 is preferably positioned such that its bottom edge 238 is about 0.030 inches above pulley 230.

Cable 240 is preferably a thin metal cable connected to curved portion 236 of the capstan drum. Other types of durable cables, cords, wire, etc. can be used as well. Cable 240 is attached at a first end to curved portion 236 near an end of leg portion 234 and is drawn tautly against the outer surface 238 of curved portion 236. Cable 240 is wrapped around pulley 230 a number of times and is then again drawn tautly against outer surface 238. The second end of cable 240 is firmly attached to the other end of curved portion 236 near the opposite leg of leg portion 238. The cable transmits rotational force from pulley 230 to the capstan drum 216, causing capstan drum 216 to rotate about axis B as explained below. The cable also transmits rotational force from drum 216 to the pulley and transducer 226b. The tension in cable 240 should be at a level so that negligible backlash or play occurs between capstan drum 216 and pulley 230. Preferably, the tension of cable 240 can be adjusted by pulling more (or less) cable length through an end of curved portion 236. Caps 242 on the ends of curved portion 236 can be used to tighten cable 240.

Capstan pulley 230 is a (optionally threaded) metal cylinder which transfers rotational force from transducer 226b to capstan drum 216 and from capstan drum 216 to transducer 226b. Pulley 230 is rotationally coupled to vertical support member 214 by a shaft 246 (shown in FIG. 6a) positioned through a bore of vertical member 214 and rigidly attached to pulley 230. Transducer 226b is coupled to pulley 230 by shaft 246 through vertical support member 214. Rotational force is applied from transducer 226b to pulley 230 when the actuator of transducer 226b rotates the shaft. The pulley, in turn, transmits the rotational force to cable 240 and thus forces capstan drum 216 to rotate in a direction about axis B. Extension member 146b rotates with capstan drum 216, thus causing force along the second degree of freedom for object 34. Note that pulley 230, capstan drum 216 and extension member 146b will only actually rotate if the user is not applying the same amount or a greater amount of rotational force to object 34 in the opposite direction to cancel the rotational movement. In any event, the user will feel the rotational force along the second degree of freedom in object 34 as force feedback.

The capstan mechanism 210 provides a mechanical advantage to apparatus 200 so that the force output of the actuators can be increased. The ratio of the diameter of pulley 230 to the diameter of capstan drum 216 (i.e. double the distance from axis B to the bottom edge 238 of capstan drum 216) dictates the amount of mechanical advantage, similar to a gear system. In the preferred embodiment, the ratio of drum to pulley is equal to 15:1, although other ratios can be used in other embodiments.

Similarly, when the user moves object 34 in the second degree of freedom, extension member 146b rotates about axis B and rotates capstan drum 216 about axis B as well. This movement causes cable 240 to move, which transmits the rotational force to pulley 230. Pulley 230 rotates and causes shaft 246 to rotate, and the direction and magnitude of the movement is detected by the sensor of transducer 226b. A similar process occurs along the first degree of freedom for the other capstan drive mechanism 210. As described above with respect to the actuators, the capstan drive mechanism provides a mechanical advantage to amplify the sensor resolution by a ratio of drum 216 to pulley 230 (15:1 or 20:1 in the preferred embodiment).

Stop 232 is rigidly coupled to vertical support member 214 a few millimeters above curved portion 236 of capstan drum 216. Stop 232 is used to prevent capstan drum 216 from moving beyond a designated angular limit. Thus, drum 216 is constrained to movement within a range defined by the arc length between the ends of leg portion 234. This constrained movement, in turn, constrains the movement of object 34 in the first two degrees of freedom.

FIG. 6a is a side elevational view of capstan mechanism 210 as shown in FIG. 6. Cable 240 is shown routed along the bottom side 238 of curved portion 236 of capstan drum 216. Cable 240 is preferably wrapped around pulley 230 so that the cable is positioned between threads 248, i.e., the cable is guided by the threads 254 as shown in greater detail in FIG. 6b. As pulley 230 is rotated by transducer 226b or by the manipulations of the user, the portion of cable 240 wrapped around the pulley travels closer to or further from vertical support member 214, depending on the direction that pulley 230 rotates. For example, if pulley 230 is rotated counter-clockwise (when viewing the pulley as in FIG. 6), then cable 240 moves toward vertical support member 214 as shown by arrow 250. Capstan drum 216 also rotates clockwise as shown by arrow 252. The threads of pulley 230 are used mainly to provide cable 240 with a better grip on pulley 230. In alternate embodiments, pulley 230 includes no threads, and the high tension in cable 240 allows cable 240 to grip pulley 230.

Capstan drive mechanism 210 is advantageously used in the present invention to provide transmission of forces and mechanical advantage between transducers 226a and 226b and object 34 without introducing substantial compliance, friction, or backlash to the system. A capstan drive provides increased stiffness, so that forces are transmitted with negligible stretch and compression of the components. The amount of friction is also reduced with a capstan drive mechanism so that substantially "noiseless" tactile signals can be provided to the user. In addition, the amount of backlash contributed by a capstan drive is also negligible. "Backlash" is the amount of play that occurs between two coupled rotating objects in a gear or pulley system. Two gears, belts, or other types of drive mechanisms could also be used in place of capstan drive mechanism 210 in alternate embodiments to transmit forces between transducer 226a and extension member 146b. However, gears and the like typically introduce some backlash in the system. In addition, a user might be able to feel the interlocking and grinding of gear teeth during rotation of gears when manipulating object 34; the rotation in a capstan drive mechanism is much less noticeable.

FIG. 7a is a perspective view of a prior art rotor 300 used in a common brush-type DC motor used in prior art force feedback interface devices. FIGS. 7b and 7c are side and front end views of rotor 20, respectively. The rotor 300 includes a shaft 302, slots 304, and teeth 306. Shaft 302 is arranged coincident with axis of rotation A of the rotor and typically protrudes from the housing of the motor. The shaft may be coupled to a mechanism or member, such as capstan mechanism 210 or extension member 146, that is rotatably moved through space from the rotational movement of the shaft about axis A. Teeth 306 are members projecting from the shaft 302 and are typically equally spaced about the circumference or perimeter of the shaft 302. The number of teeth 306 may vary in different motors from 2 to larger numbers, such as 5, 9, etc. Teeth 306 preferably include supports 305 and, at the ends of the teeth, T-sections 307, which can be arranged approximately perpendicularly to the support sections 305 to form a "T" shape (as shown in FIG. 7c). In between each T-section of the teeth 306 is a slot 304, which is the gap or empty space between the edges of the T-sections. As shown in FIG. 7b, the slots 304 and teeth 306 of prior art rotor 300 are arranged in their lengthwise dimension d to be parallel with the axis A and shaft 302, i.e., the edges of the T-sections 307 of the teeth 306 are parallel to axis A.

Figure 7D:
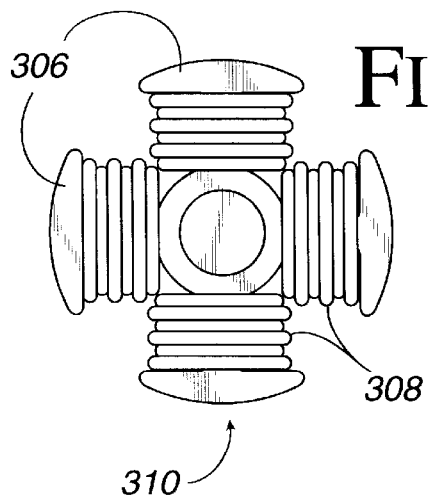

FIG. 7d is an end view of a typical rotor 310 having coils wrapped around the teeth 306. As shown, coils 308 are wrapped in loops around each support 305 of the teeth of the rotor, where one or more loops of coils may be provided. The coils are typically a metallic wire, such as copper or aluminum. As is well known to those skilled in the art, electrical current is flowed through coils 308 within a magnetic field to cause a torque on rotor 310, and which is described in greater detail with respect to FIGS. 8a and 8b.

Figure 8A:
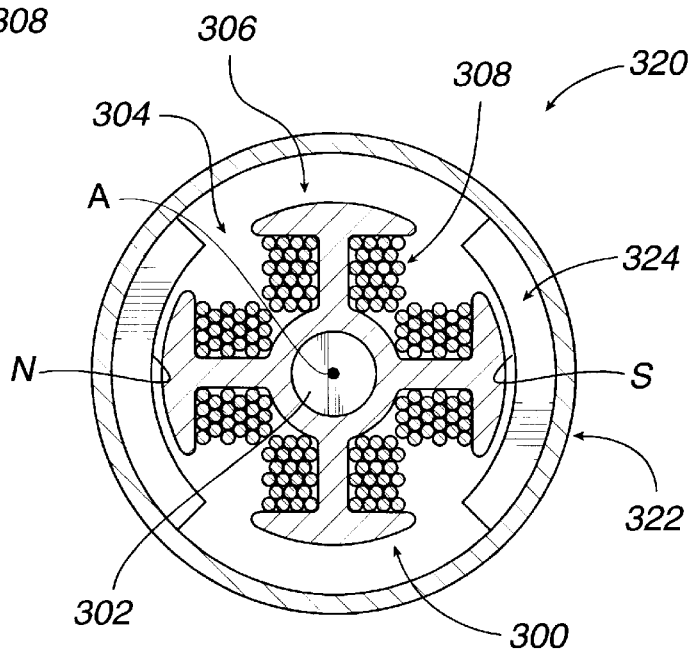
FIGS. 8a and 8b are sectional views of prior art DC motors including the rotor of FIGS. 7a–d.
Figure 8B:
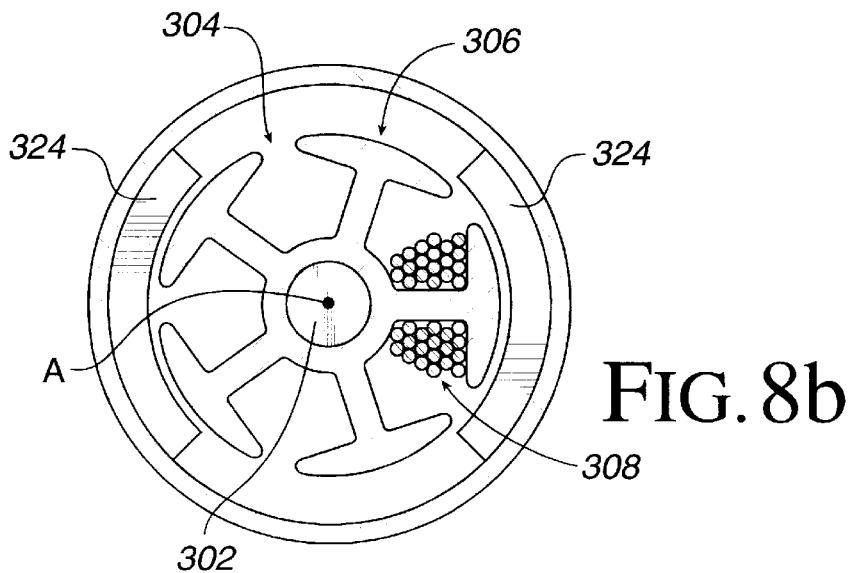

FIGS. 8a and 8b are sectional views of DC motors 320a and 320b of the prior art. FIG. 8a shows a motor 320a having four slots 304 and teeth 306, and FIG. 8b shows a motor 320b having five slots 304/teeth 306. Motors 320 include a housing 322, permanent magnets 324, and rotor 300. Housing 322 provides a support for the stationary portions (i.e., the stator) of the motor 320 and also functions as a magnetic flux guide. Magnets 322 are coupled to the housing and are typically provided on opposing sides of the interior of the housing. Magnets 322 typically have opposite magnetic poles to each other facing inward toward the center of the housing (e.g., a north face N of one magnet faces inward, and a south face S of the other magnet faces inward). Shaft 302 of rotor 300 is rotatably coupled to housing 322 so that rotor 300 may rotate about axis A. A cross section of coils 308 is shown wrapped around each support 305 of the teeth 306 of the rotor 300.

As is well known to those skilled in the art, permanent magnets 324 create a static magnetic field which interacts with a variable magnetic field produced by electric current flowing through coils 308. The magnetic fields are directed through the stator and rotor commonly using ferrous structures, such as iron. The rotor 300 rotates about axis A within housing 322 in a direction determined by the direction of the current through the coils 308.

A problem that occurs with the prior art motors is called cogging. Cogging is the tendency of a motor rotor to align itself in a preferential position with respect to the stator. In a typical brush-type DC motor there may be multiple positions per shaft revolution where the motor rotor prefers to rest. For example, as shown in FIG. 8a, a rotor having four teeth 306 may preferentially align itself in the shown position with reference to the magnets 324. Another preferential position may be when the rotor is rotated 90 degrees from the position shown in the FIG. 8a. In FIG. 8b, there may be cogging positions of the rotor in the position shown and in similar positions of the rotor within a single revolution.

Cogging is fundamentally caused by the change in reluctance of the magnetic flux path: the preferential positions are essentially "reluctance minimization points" where the energy stored in the magnetic circuit is at a minimum. For example, when one or more of the teeth 306 are nearest to or aligned with the magnets 324, the propensity is greatest. As the rotor turns, the teeth 306 move out of alignment with the magnets and the motion of the rotor and the propensity is reduced, thus causing an abrupt change in magnetic torque applied to the rotor. The cause of this abrupt change is the straight (non-skewed) nature of the edges of teeth 306 and the straight slots 304 between teeth 306, allowing one tooth to abruptly move out of alignment with a magnet (or magnetic field) before the next tooth abruptly enters into alignment with the magnet (or magnetic field). The cogging effect is also known as "detenting" or "ratcheting" and can result in substantial variation in the output torque of the motor, both when powered and unpowered.

The user of a force feedback device may feel the cogging effect as "roughness" "pulsations" or "steps" when the user object 34 is moved by the user's hand or fingers or when forces are output on the user object 34. Since the user object 34 is coupled (through other members) to the shaft 302 of the motor, the rotor 300 is rotated about axis A whenever the user object is moved in the degree of freedom associated with the motor. Thus, since the cogging effect occurs whether the motor is powered or is not powered, the user feels the "pulsating" feeling from the rotor cogging even when the user object is moved and no forces are output from the motor. In addition, in many force feedback systems, multiple motors are provided to apply forces in multiple degrees of freedom, such that the additional motors contribute to the resultant cogging effect felt by the user. Furthermore, since a high bandwidth transmission system is preferably used (e.g., with the capstan drive system of FIG. 6), the cogging is further amplified and felt more strongly by the user due to the lack of friction and other "mushiness" in the system which would otherwise tend to mask the cogging effect. Finally, in force feedback interface systems, the output forces of a motor are amplified to allow realistic and immersive forces to be output to the user; for example, in the preferred embodiment of the force feedback interface, the capstan transmission system provides a 15:1 or 20:1 mechanical advantage in amplifying output forces. However, this amplification of force magnitudes also has the undesirable side effect of amplifying the cogging effect, so that the user feels a more noticable cogging during use of the inteface device. Thus the need for the reduction of cogging is very great in high bandwidth force feedback interface systems, where the application of large magnitude, smooth, and realistic forces are a primary objective.

Figure 9A:
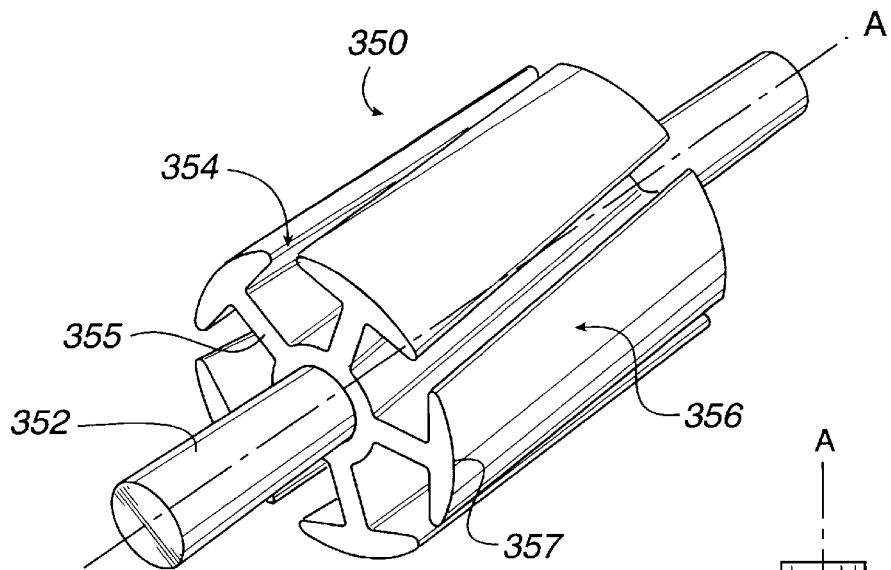
FIGS. 9a–c are views of a skewed rotor of the present invention for use in a DC motor.
Figure 9B:
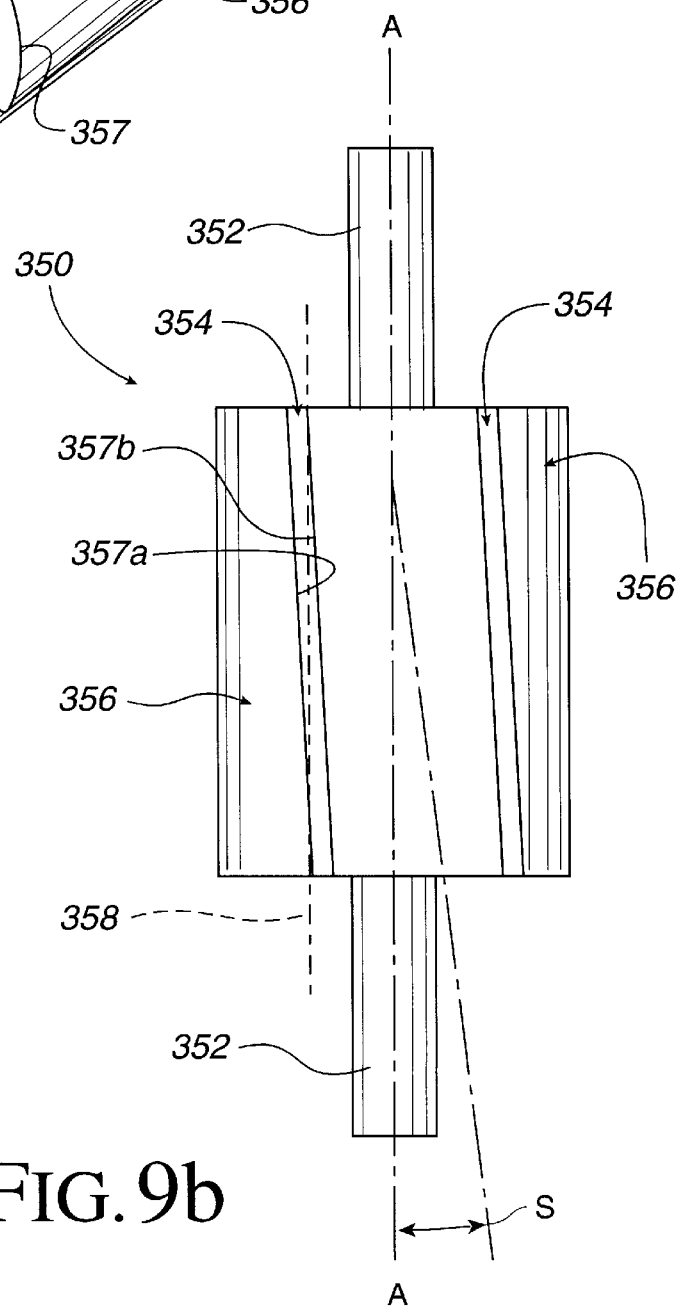
Figure 9C:
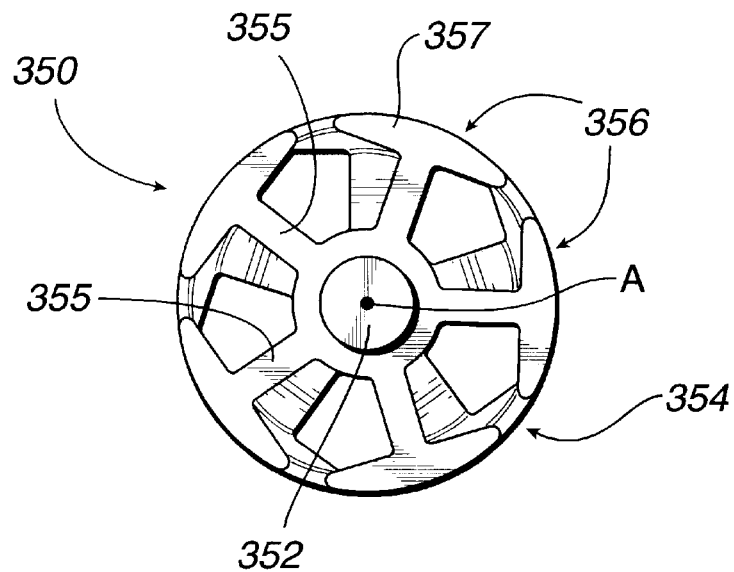

FIG. 9a is a perspective view of a rotor 350 of the present invention for use in a common brush-type DC motor or other similar type of motor. FIGS. 9b and 9c are side and front end views of rotor 350, respectively. Similar to the rotor of the prior art shown in FIGS. 7a–c, the rotor 350 includes a shaft 352, slots 354, and teeth 356. Shaft 352 is arranged coincident with axis of rotation A of the rotor and typically protrudes from the housing of the motor. The shaft is coupled to a mechanism or member that is rotatably moved through space due to the rotational movement of the shaft about axis A. Teeth 356 are members projecting from the shaft 352 and typically equally spaced about the circumference or perimeter of shaft 352. The number of teeth 356 may vary in different motors from 2 to larger numbers, such as 5, 9, etc. Each tooth 356 includes a support 355 and, at the end of the support 355, a T-section 357, which is arranged approximately perpendicularly to the support 355 (in the view of FIG. 9c).

An important difference between the rotor 350 and the prior art rotor 300 is the orientation or "skew angle" of the T-sections 357 of the rotor 350. As shown in FIG. 9b, the slots 304 and teeth 306 of rotor 350 are arranged in their lengthwise dimension d to be skewed with respect to the axis A and shaft 352, creating a helical configuration of teeth and slots. The amount of skew from axis A is preferably measured as a percentage of slot width (or, alternatively, as a skew angle S; however, the skew angle is a function of motor dimensions). Slot width is the distance of size of a slot 354 between two adjacent T-sections of teeth 356. The percentage indicates the fraction of a slot length that an end of a tooth is skewed. The teeth 356 are skewed by the percentage of slot width for their entire length, where the optimum amount of twist is one slot width, or 100% skew. For example, edges 357a and 357b of teeth 356 are twisted or skewed such that the bottom of edge 357a is aligned with the top of edge 357b parallel to axis A, as shown by dashed line 358. This is 100% slot width skew. 50% slot width skew would exist if the top of edge 357b is half the distance of a slot 354 from a center line 358. Typically, over 50% skew provides noticable reduction of the cogging effect, while greater than 100% skew does not add much improvement over 100% skew. The skew of teeth 306 can also be measured with reference to the edge 370 of magnets 364 (shown in FIG. 10).

Figure 10:
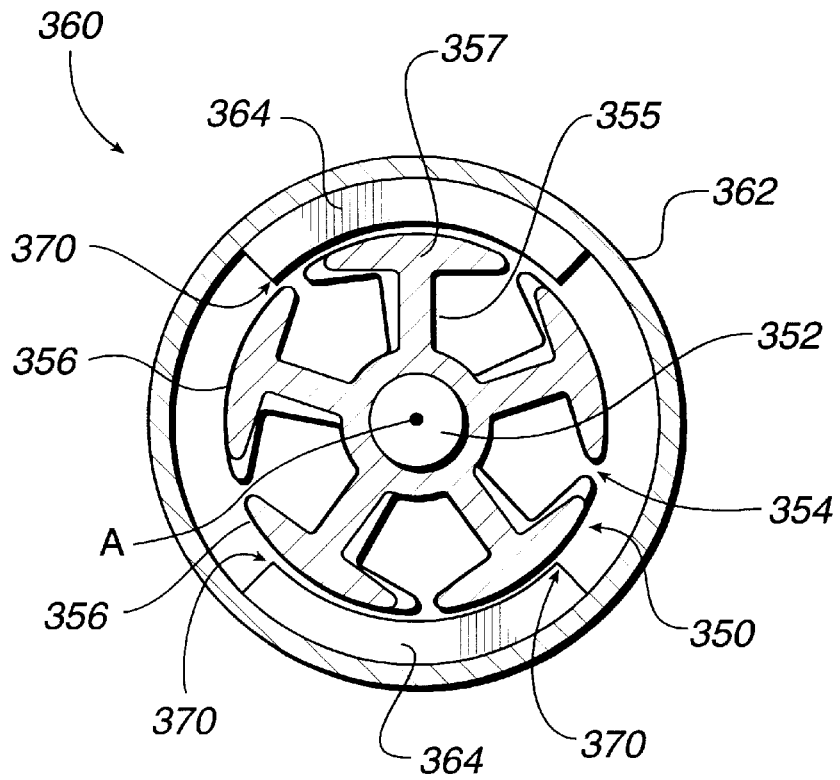
FIG. 10 is a sectional view of a DC motor including the skewed rotor of FIGS. 9a–c.

FIG. 10 shows a sectional view of an example of rotor 350 of the present invention situated in a motor 360. Housing 362 provides support for the motor components and functions as a magnetic flux guide. Grounded magnets 364 are coupled to the interior of the housing 362. Shaft 352 of rotor 350 is rotatably coupled to housing 362 so that rotor 350 may rotate about axis A. Coils are not shown in this drawing but are preferably wrapped around supports 355 similarly as described with respect to FIG. 8b. Due to the skewed nature of the supports 355 and T-sections 357 of teeth 356, the slots 355 between teeth 356 when viewed at an end of the rotor is much smaller than in the prior art (or zero), allowing the teeth to gradually enter and exit the magnetic field of magnets as described below.

The skewed teeth 356 of motor 350 serve to greatly alleviate the cogging problems found in prior art motors. The skewing of the rotor reduces the propensity of the rotor teeth 356 to align with the magnets in the stator as the motion of the rotor teeth passing by the magnets is less abrupt than with straight teeth. This is because, in the skewed design, as one tooth gradually moves out of alignment with a magnet, a new tooth begins to gradually engage the magnetic field and move into alignment with the magnet. As the teeth are rotated further, a greater portion of the exiting tooth exits the magnetic field as a greater portion of the new tooth engages the magnetic field. There is therefore no abrupt change in interaction between teeth and magnets since all positions of the rotor allow at least some interaction between a tooth and the magnetic field. The gradual exit-entry transition is made possible by the skewed or helical arrangement of the rotor teeth. In the prior art "straight slot" arrangement, the rotor teeth enter and exit the influence of the magnet abruptly, creating the cogging effect which is undesirably perceived by the user of a force feedback system. When the skewed rotor of the present invention are used in motors of a force feedback system, the user perceives very little or no cogging and therefore experiences much more realistic and immersive force feedback when interacting with a computer-controlled environment, simulation, game, or the like.

Another advantage to the skewed rotor of the present invention is that very little cost, if any, is added to manufacture rotor 350 in comparison with prior art rotor 300. Rotors are usually constructed by stacking many thin metal stampings or laminations on top of one another on a mandrel. To create a skewed rotor, the mandrel can include skewed "fingers" on which to stack the laminations. Once all the laminations are stacked, the rotor can be bonded together in the usual way and may continue normally in the production process. Alternatively, the laminations can be stacked with straight fingers, creating straight teeth on the rotor. A helical displacement is then mechanically imparted on the stack of laminations to create the desired skew angle.

As mentioned above, the skew of teeth 306 can also be measured with reference to the edge of magnets 364 (shown in FIG. 10). For example, the edge 370 of the magnet may be provided in a parallel arrangement with respect to the axis of rotation A and the % of skew or skew angle of the teeth 356 can be measured with respect to the edges 370. If edges 370 have some skew to them, the skew of teeth 356 can be measured relative to that skew. It is the skew of the edges of the magnet that determines the shape of the magnetic field and thus helps determine how gradually the teeth exit and enter the magnetic field.

It should be noted that there are other ways to achieve essentially the same effect in both brush-type and brushless motors. For example, in a brush type motor it is possible to skew the edges of stationary or grounded magnets 324 rather than skewing the rotor 300, thus achieving the same gradual transition effect which reduces cogging torques. Alternatively, both the magnets and the rotor may be skewed; if both are skewed, then the skew can be provided in opposite directions or at different angles such that the difference in teeth and magnet edge angles provides the desired skew.

In a brushless motor where the windings are typically located on the stationary stator and the magnets are located on a solid, ferromagnetic rotor, similar design variations can be provided. To To reduce cogging in brushless motors, the lamination stack of the stator can be skewed similarly to the rotor in brush-type motors as described above. Alternatively, in brushless motors the magnets can be skewed, or both the magnets and the rotor can be skewed. In this way, the reduction in the cogging technique can be accomplished similarly as described above.

While this invention has been described in terms of several preferred embodiments, it is contemplated that alterations, modifications and permutations thereof will become apparent to those skilled in the art upon a reading of the specification and study of the drawings. For example, many different types and standards of communication interfaces can be used with the interface device closed herein. In addition, many different types of gimbal mechanisms or other mechanisms can be provided to allow movement of the user object in desired degrees of freedom. A variety of different types of actuators, sensors, and other devices can also be used to sense the position of an object and apply forces to the object along degrees of freedom.

Furthermore, certain terminology has been used for the purposes of descriptive clarity, and not to limit the present invention. It is therefore intended that the following appended claims include all such alterations, equivalents, and permutations as fall within the true spirit and scope of the present invention.

What is claimed is:

1. A force feedback interface device for providing high-fidelity force sensations to a user of the device, said interface device being coupled to a host computer and allowing said user to interact with an application program implemented by said host computer, said force feedback interface device comprising:

a user object graspable by said user and movable in at least one rotary degree of freedom;

a sensor for reporting a locative signal to said host computer, said locative signal indicating a position of said user object within said rotary degree of freedom;

an actuator coupled to said user object and to said host computer, said actuator outputting forces on said user object in response to signals from said host computer such that said forces are in response to said locative signal and are coordinated with events within said application program, said actuator having a reduced cogging effect such that said forces felt by said user are substantially free of force pulsations caused by said cogging effect when said user object is moved in said rotary degree of freedom, said actuator comprising:

a housing;

a set of magnets rigidly coupled to said housing, said magnets provided on opposing surfaces of an interior of said housing and creating a magnetic field;

a rotor rotatably coupled to said housing and to said user object and positioned between said magnets, said rotor operative to rotate about an axis of rotation approximately parallel to faces of said magnets, said rotor including a shaft and a plurality of teeth spaced apart equally about a circumference of said shaft, wherein said teeth and said magnets are provided in a skewed, helical arrangement relative to each other such that as said rotor rotates about said axis, a portion of one of said teeth exits said magnetic field as a portion of a next consecutive tooth is entering said magnetic field; and a coil, wherein an electric current flows through said coil to cause said rotor to rotate about said axis of rotation; and a drive transmission coupled between said actuator and said user object, said drive transmission amplifying said forces output by said actuator on said user object.

2. A force feedback interface device as recited in claim 1 wherein said teeth of said rotor are skewed relative to said shaft of said rotor.

3. A force feedback interface device as recited in claim 2 wherein said teeth are skewed relative to said shaft by an angle measured as a percentage of slot width, wherein said slot width is a distance between two adjacent teeth of said rotor.

4. A force feedback interface device as recited in claim 1 wherein said teeth of said rotor are skewed relative to edges of said magnets.

5. A force feedback interface device as recited in claim 2 wherein said coil is provided on at least one of said teeth.

6. A force feedback interface device as recited in claim 1 wherein said teeth have edges approximately parallel to said axis of rotation and wherein edges of said magnets are skewed relative to said axis of rotation.

7. A force feedback interface device as recited in claim 1 wherein said teeth are skewed relative to said axis of rotation and wherein edges of said magnets are skewed relative to said axis of rotation.

8. A force feedback interface device as recited in claim 1 wherein said shaft is coupled to a member of a gimbal mechanism that is coupled to said user object.

9. A force feedback interface device as recited in claim 8 wherein said drive transmission includes a capstan drive mechanism that is coupled to said member, said capstan drive mechanism providing mechanical advantage to a torque output on said shaft such that said force provided by said actuator is amplified in magnitude when applied to said user object.

10. A force feedback interface device as recited in claim 9 wherein said capstan drive mechanism includes a cable for transmitting said force and provides low compliance and a high bandwidth transmission of forces from said actuator to said user object.

11. A force feedback interface device as recited in claim 10 wherein said actuator is a first actuator, and further comprising a second actuator having a second rotor similar to said rotor in said first actuator, said two actuators being grounded.

12. A force feedback interface device as recited in claim 1 wherein said actuator is a DC servo motor.

13. A force feedback interface device as recited in claim 12 wherein said actuator is a brush-type motor.

14. A force feedback interface device as recited in claim 12 wherein said actuator is a brushless motor.

15. A force feedback interface device manipulated by a user and communicating with a host computer system implementing a host application program, said host application program displaying images on a computer display apparatus, said host computer system updating said host application program in response to user manipulation of said interface device and commanding force feedback sensations on said user in response to said manipulations and in coordination with events in said host application program, said force feedback interface device comprising:

a user object movable in a degree of freedom by a user and being physically contacted by said user;

a gimbal mechanism rotationally coupled to a support, said gimbal mechanism providing a plurality of rotary degrees of freedom to said user manipulatable object with respect to said support;

a grounded actuator coupled between said gimbal mechanism and said support for applying a rotational force along a first one of said degrees of freedom to said user object in accordance with a force signal from said host computer, said force signal causing said force to be coordinated with said host application program, thereby causing a feel sensation that corresponds with a relevant event within said host application program, said actuator including a grounded magnet and a rotor having skewed teeth with respect to said magnet to reduce force pulsations caused by a cogging effect of said actuator during movement of said user object in said first degree of freedom and to provide said feel sensation as felt by said user substantially without said force pulsations caused by said cogging effect;

an amplification transmission coupled between said actuator and said gimbal mechanism, said amplification transmission amplifying said force provided by said actuator, said amplified force being applied to said user object; and a sensor for detecting a position of said user object along at least one of said degrees of freedom and outputting locative signals to said host computer system, said locative signals including information representative of said position of said user object, wherein said host application program updates said images in response to said locative signals and said position of said user object and said user interacts with said host application program by moving said user object.

16. A force feedback interface device as recited in claim 15 wherein said actuator is a DC servo motor.

17. A force feedback interface device as recited in claim 16 wherein said actuator is a brush-type motor.

18. A force feedback interface device as recited in claim 15 wherein said actuator is a first grounded actuator and further comprising a second grounded actuator for applying a rotational force along a second degree of freedom to said user object in accordance with a force signal from said host computer, said second grounded actuator including a grounded magnet and a rotor skewed with respect to said magnet to reduce force pulsations caused by a cogging effect of said second actuator during movement of said user object in said second degree of freedom and to provide said feel sensation as felt by said user substantially without said force pulsations caused by said cogging effect.

19. A force feedback interface device as recited in claim 15 further comprising a device microprocessor, separate from said host computer system, for communicating with said host computer system via a communication bus by receiving a host force command from said host computer system, said host force command being output from said host computer system in response to and coordinated with events within said host application program, said microprocessor executing a local process in parallel with said execution of said host application program for receiving and decoding said host force command and outputting a force signal to said actuator in response to a decoded host command, wherein said local process is stored in a local memory separate from said host computer and accessible to said device microprocessor.

20. A force feedback interface device as recited in claim 15 wherein said amplification transmission includes a capstan drive mechanism, said capstan drive mechanism being coupled between a shaft of said rotor of said actuator and said user manipulable object and providing mechanical advantage to a torque output by said actuator.

21. A force feedback interface device as recited in claim 20 wherein said capstan drive mechanism includes a drum, a capstan pulley, and a cable, said drum being coupled to said gimbal mechanism and said pulley being coupled to said drum by said cable and to said shaft of said rotor.

22. A force feedback interface device as recited in claim 15 wherein said teeth of said rotor are skewed relative to said shaft of said rotor by an angle measured as a percentage of slot width, wherein said slot width is a distance between two adjacent teeth of said rotor.

23. A force feedback interface device manipulated by a user and communicating with a host computer system implementing a host application program, said host application program displaying images on a computer display apparatus, said host computer system updating said host application program in response to user manipulation of said interface device and commanding force feedback sensations on said user in response to said manipulations and in coordination with events in said host application program, said force feedback interface device comprising:

a user object movable in a degree of freedom by a user and being physically contacted by said user;

a gimbal mechanism rotationally coupled to a support, said gimbal mechanism providing a plurality of rotary degrees of freedom to said user manipulatable object with respect to said support;

a grounded actuator coupled between said gimbal mechanism and said support for applying a rotational force along a degree of freedom to said user object in accordance with a force signal, said force signal causing said force to be coordinated with said host application program, thereby causing a feel sensation that corresponds with a relevant event within said host application program;

a sensor for detecting a position of said user object along at least one of said degrees of freedom and outputting locative signals to said host computer system, said locative signals including information representative of said position of said user object, wherein said host application program updates said images in response to said locative signals and said position of said user object and said user interacts with said host application program by moving said user object; and a device microprocessor, separate from said host computer system, for communicating with said host computer system via a communication bus by receiving a host force command from said host computer system, said host force command being output from said host computer system in response to and coordinated with events within said host application program, said microprocessor executing a local process in parallel with said execution of said host application program for receiving and decoding said host force command and outputting said force signal to said actuator in response to a decoded host command, wherein said local process is stored in a local memory separate from said host computer and accessible to said device microprocessor, and wherein said host commands include at least one of:

direct host commands for commanding said microprocessor to immediately output a desired force according to a force routine selected by said direct host command, reflex commands for commanding said microprocessor to output a desired force according to a force routine selected by said reflex command and when said microprocessor determines that predetermined conditions have been met, and custom profile commands for commanding said microprocessor to receive a set of data from said host computer to command said microprocessor to output a sequence of forces over time based on said set of data.

24. A force feedback interface device as recited in claim 23 wherein said actuator includes a grounded magnet and a rotor skewed with respect to said magnet to reduce a cogging effect of said actuator on provide a smoother feel to said user object as experienced by said user when said user object is moved in said degree of freedom than when said cogging effect is not reduced.

25. A force feedback interface device as recited in claim 23 wherein said direct host commands may command at least one of a jolt force, a spring force, a wobble force, and a damping force.

26. A force feedback interface device as recited in claim 23 wherein said predetermined conditions for said reflex commands include a selection of a button on said user object by said user.

27. A force feedback interface device as recited in claim 23 wherein said set of data used for said custom profile commands includes a predetermined set of force magnitudes and timing information instructing said microprocessor when to control said actuator to output said force magnitudes.

* * * * *